United States Patent
Simms

(10) Patent No.: US 12,043,409 B2
(45) Date of Patent: Jul. 23, 2024

(54) MUOS PIN SECURITY FOR AVIONICS MANAGEMENT SYSTEM

(71) Applicant: Rockwell Collins, Inc., Cedar Rapids, IA (US)

(72) Inventor: Christine M. Simms, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/880,168

(22) Filed: Aug. 3, 2022

(65) Prior Publication Data

US 2024/0092501 A1   Mar. 21, 2024

(51) Int. Cl.
G06F 7/04       (2006.01)
B64D 45/00      (2006.01)
H04B 7/185      (2006.01)

(52) U.S. Cl.
CPC ..... B64D 45/0015 (2013.01); H04B 7/18506 (2013.01)

(58) Field of Classification Search
CPC .......... B64D 45/0015; H04B 7/18506
See application file for complete search history.

(56) References Cited

U.S. PATENT DOCUMENTS

| | | | |
|---|---|---|---|
| 5,226,080 A | 7/1993 | Cole et al. | |
| 5,559,505 A | 9/1996 | McNair | |
| 8,220,038 B1 * | 7/2012 | Lucchesi | H04L 63/105 726/4 |
| 8,244,209 B2 | 8/2012 | Harvey et al. | |
| 8,640,228 B2 * | 1/2014 | Croize | G06F 21/6218 726/20 |
| 8,819,775 B2 | 8/2014 | Leconte et al. | |
| 10,313,341 B2 | 6/2019 | Stoops et al. | |
| 2003/0101359 A1 | 5/2003 | Aschen et al. | |
| 2011/0148192 A1 | 6/2011 | Brooks | |
| 2016/0337820 A1 * | 11/2016 | Yousefi'zadeh | H04L 12/1877 |

(Continued)

FOREIGN PATENT DOCUMENTS

EP    3958529 A1    2/2022

OTHER PUBLICATIONS

Hartmans, Avery, "There's a scary iPhone feature that erases all your data after too many password attempts—here's why you should turn it on anyway", Business Insider, Dec. 2018, https://www.businessinsider.com/iphone-security-failed-passcode-attempts-2018-6.

(Continued)

*Primary Examiner* — Hongmin Fan
(74) *Attorney, Agent, or Firm* — Suiter Swantz IP

(57) ABSTRACT

An aircraft is described. The aircraft includes an avionics management system including one or more control display units. The control display units include an alphanumeric keyboard. By the alphanumeric keyboard, an operator within the aircraft may input a personal identification number (PIN). The input PIN is received from the alphanumeric keyboard and compared with a PIN stored in memory. When the input PIN is validated, the avionics management system changes a system state from not validated to validated, thereby permitting the control display unit to access otherwise unavailable mobile user objective system (MUOS) feature sets, such as viewing MUOS presets or tuning to the MUOS presets.

15 Claims, 22 Drawing Sheets

(56) References Cited

U.S. PATENT DOCUMENTS

2018/0247483 A1  8/2018  Lindsay
2020/0259820 A1  8/2020  Mccall
2022/0108207 A1  4/2022  Graf et al.

OTHER PUBLICATIONS

Junyan Guo, Ye Du, "A Novel RLWE-Based Anonymous Mutual Authentication Protocol for Space Information Network", Security and Communication Networks, vol. 2020, Article ID 5167832, 12 pages, 2020. https://doi.org/10.1155/2020/5167832.
Extended European Search Report dated Nov. 27, 2023; European Application No. 23188665.6.

\* cited by examiner

MUOS PIN SECURITY FOR AVIONICS MANAGEMENT SYSTEM

STATEMENT REGARDING FEDERALLY SPONSORED RESEARCH OR DEVELOPMENT

This invention was made with government support under 70203819DB2000005 awarded by the United States Coast Guard Aviation Logistics Center (ALC). The government has certain rights in the invention.

TECHNICAL FIELD

The present invention generally relates to communication networks, and more specifically to restricting access to the communication networks.

BACKGROUND

Aircraft are commonly held in secured airports while unattended. However, some mission requirements may cause the aircraft to be left at unsecured airports. The unsecured airports may allow bad actors to gain physical access to the aircraft. Given the mission requirements, physical security of sensitive communication equipment within the aircraft may not be viable. It is contemplated that a bad actor may gain access to a mobile user objective system (MUOS) network if one or more components of the aircraft are removed and installed in a lab environment. Therefore, it would be advantageous to provide a device, system, and method that cures the shortcomings described above.

SUMMARY

A control display unit is described, in accordance with one or more embodiments of the present disclosure. In one illustrative embodiment, the control display unit includes a display. In another illustrative embodiment, the control display unit includes a keyboard. In another illustrative embodiment, the control display unit includes a memory maintaining program instructions, a personal identification number (PIN), and a system state. In another illustrative embodiment, the system state is in one of a not validated state or a validated state. In another illustrative embodiment, the control display unit includes a processor configured to execute the program instructions. In another illustrative embodiment, the program instructions cause the processor to detect an attempt to access a mobile user objective system (MUOS) feature set while the system state is in the not validated state. In another illustrative embodiment, the program instructions cause the processor to prevent the control display unit from accessing the MUOS feature set while the system state is in the not validated state. In another illustrative embodiment, the program instructions cause the processor to prompt for the PIN on the display in response to detecting the attempt to access the MUOS feature set. In another illustrative embodiment, the program instructions cause the processor to receive an input from the keyboard. In another illustrative embodiment, the program instructions cause the processor to validate the input with the PIN maintained in memory. In another illustrative embodiment, the program instructions cause the processor to change the system state from the not validated state to the validated state. In another illustrative embodiment, the program instructions cause the processor to allow the control display unit to access the MUOS feature set in response to changing to the validated state.

An avionics management system is described, in accordance with one or more embodiments of the present disclosure. In one illustrative embodiment, the avionics management system includes at least one control display unit comprising a display and a keyboard. In another illustrative embodiment, the avionics management system includes a processing unit communicatively coupled to the at least one control display unit. In another illustrative embodiment, the processing unit includes a memory maintaining program instructions, a personal identification number (PIN), and a system state. In another illustrative embodiment, the system state is in one of a not validated state or a validated state. In another illustrative embodiment, the processing unit includes a processor configured to execute the program instructions. In another illustrative embodiment, the program instructions cause the processor to detect an attempt to access a mobile user objective system (MUOS) feature set while the system state is in the not validated state. In another illustrative embodiment, the program instructions cause the processor to prevent the at least one control display unit from accessing the MUOS feature set while the system state is in the not validated state. In another illustrative embodiment, the program instructions cause the processor to prompt for the PIN on the display in response to detecting the attempt to access the MUOS feature set. In another illustrative embodiment, the program instructions cause the processor to receive an input from the keyboard. In another illustrative embodiment, the program instructions cause the processor to validate the input with the PIN maintained in memory. In another illustrative embodiment, the program instructions cause the processor to change the system state from the not validated state to the validated state. In another illustrative embodiment, the program instructions cause the processor to allow the at least one control display unit to access the MUOS feature set in response to changing to the validated state An aircraft is described, in accordance with one or more embodiments of the present disclosure. In one illustrative embodiment, the aircraft includes a radio configured to communicate with a mobile user objective system (MUOS) network. In another illustrative embodiment, the radio maintains a communication security (COMSEC) payload for communicating with the MUOS network. In another illustrative embodiment, the aircraft includes an avionics management system. In another illustrative embodiment, the avionics management system includes at least one control display unit comprising a display and a keyboard. In another illustrative embodiment, the at least one control display unit is communicatively coupled to the radio. In another illustrative embodiment, the at least one control display unit is configured to receive MUOS information from the MUOS network by way of the radio. In another illustrative embodiment, the avionics management system includes a processing unit communicatively coupled to the at least one control display unit. In another illustrative embodiment, the processing unit includes a memory maintaining program instructions, a personal identification number (PIN), and a system state. In another illustrative embodiment, the system state is in one of a not validated state or a validated state. In another illustrative embodiment, the processing unit includes a processor configured to execute the program instructions. In another illustrative embodiment, the program instructions cause the processor to detect an attempt to access a MUOS feature set while the system state is in the not validated state. In another illustrative embodiment, the program instructions cause the processor to prevent the control display unit from accessing the MUOS feature set while the system state is in the not validated state. In another illustrative embodiment, the program instructions cause the processor to prompt for the PIN on the display in response to detecting the attempt to access the MUOS feature set. In another illustrative embodiment, the program instructions cause the processor to receive an input from the keyboard. In another illustrative embodiment, the program instructions cause the processor to validate the input with the PIN maintained in memory. In another illustrative embodiment, the program instructions cause the processor to change the system state from the not validated state to the validated state. In another illustrative embodiment, the program instructions cause the processor to allow the control display unit to access the MUOS feature set in response to changing to the validated state.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
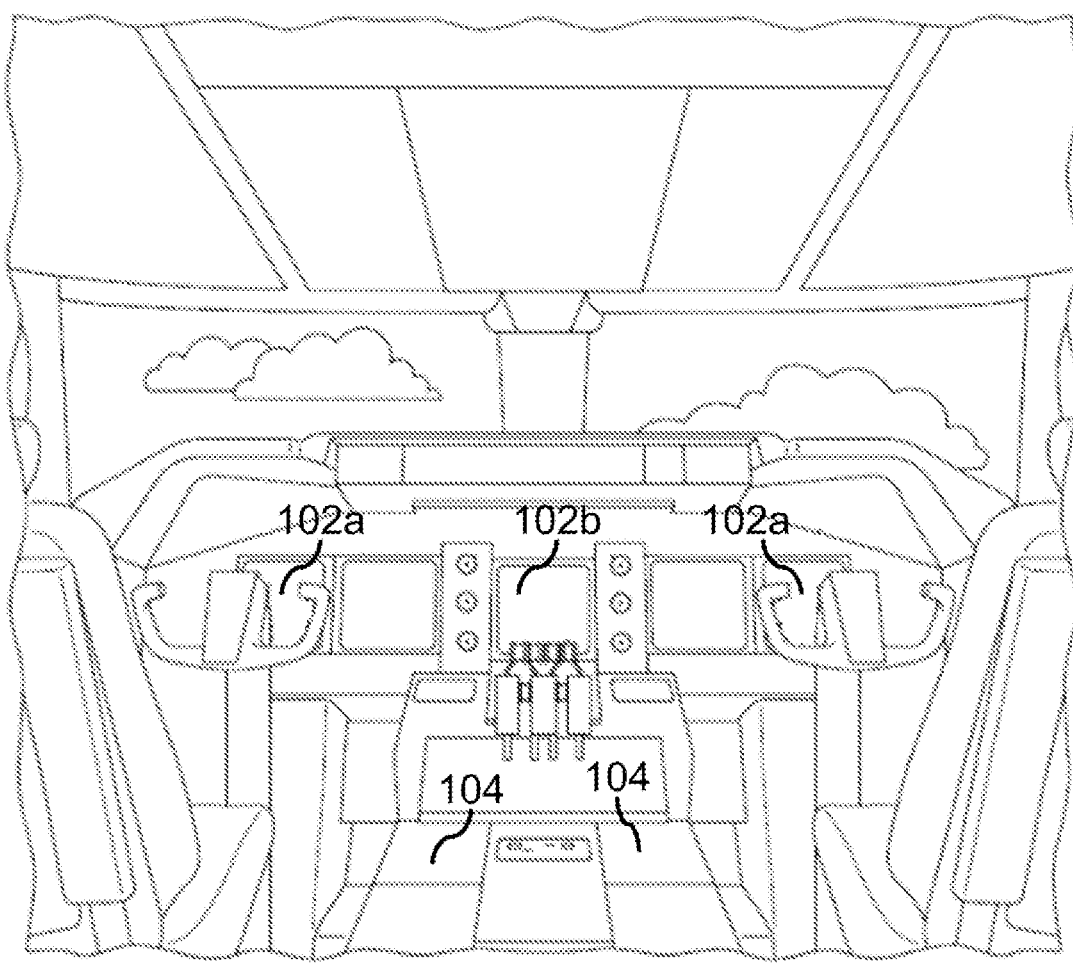
FIG. 1A depicts a perspective view within a cockpit of an aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. An avionics management system includes a suite of control display units (CDUs), multi-function displays (MFDs), and processing units. A combination of operator interfaces and software features are described for the components of the avionics management system. The avionics management system keeps a record of the system state. State may refer to one or more modes or conditions which are maintained in memory. The system state is maintained in one of a not validated state or a validated state. While the system state is the not validated state, all mobile user objective system (MUOS) functions are disabled and not accessible. While the system state is in the validated state, all MUOS function are functional and accessible. Finally, the avionics management system allows the operator to change the PIN when desired. The PIN security allows authorized users to access the restricted Avionics Management feature set, adds another layer of security to deter unauthorized users from accessing the restricted Avionics Management feature set, and allows authorized users the ability to manage aircraft unique PINs.

Figure 1B:
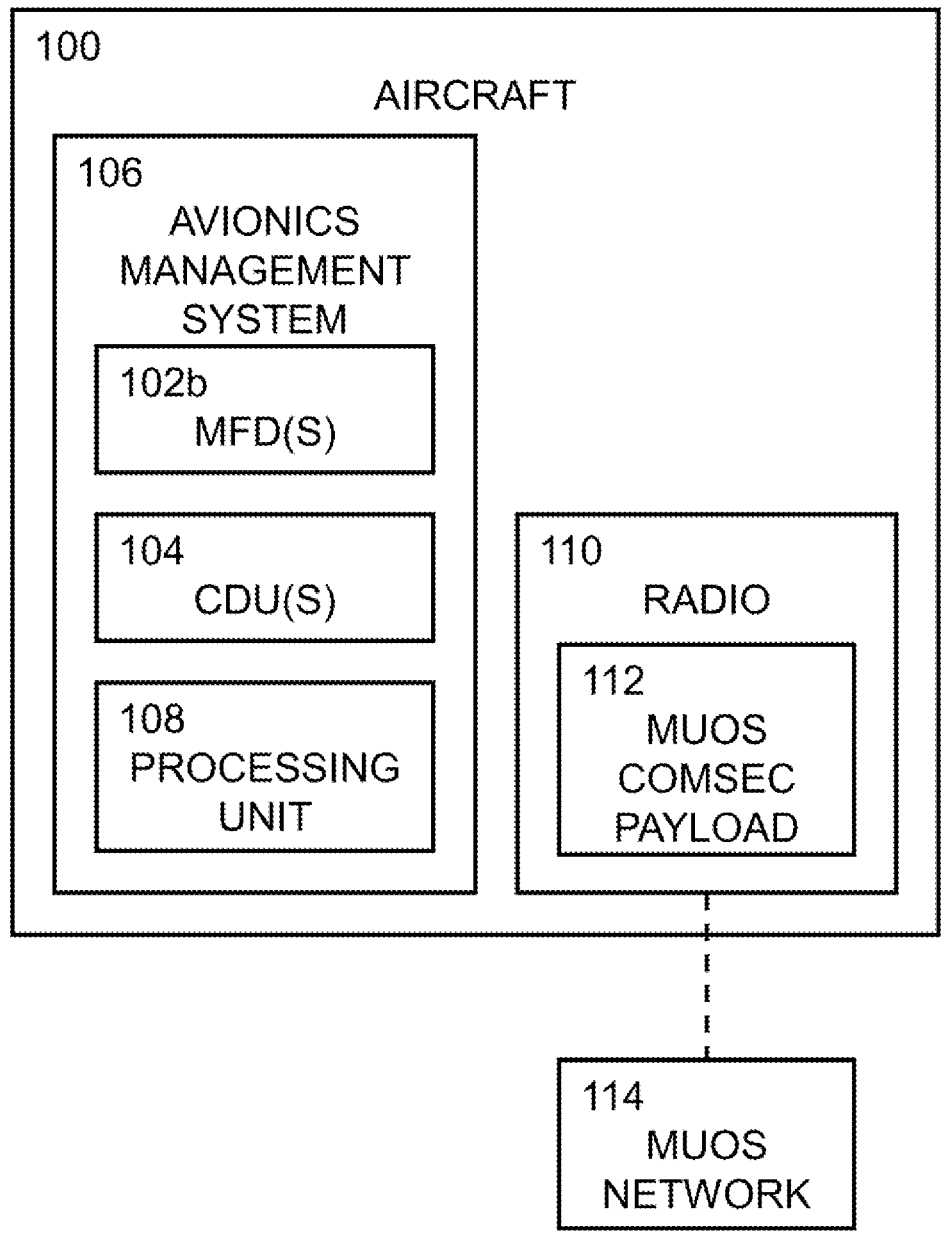
FIG. 1B depicts a simplified block diagram of an aircraft, in accordance with one or more embodiments of the present disclosure.

Referring now to FIGS. 1A-1B, an aircraft 100 is described, in accordance with one or more embodiments of the present disclosure. The aircraft 100 may be embodied within a cockpit of an aircraft. The aircraft 100 may further include various components disposed outside of the cockpit, such as, but not limited to processing elements housed in an integrated modular avionics (IMA) controller, a line replaceable unit, or the like. The aircraft 100 may include an aircraft operator (not depicted), such as a pilot, a co-pilot, or a second officer seated within the cockpit. The aircraft 100 may be embodied within any number of fixed-wing aircrafts, a rotorcraft, and the like. The number and arrangement of the various elements within the aircraft 100 may be based on the type of the aircraft. Thus, the configuration of FIG. 1A is not intended to be limiting but is merely provided for exemplary purposes. In embodiments, the aircraft 100 includes one or more flight displays 102 and one or more control display units 104 (CDU).

The aircraft 100 may include one or more of the flight displays 102. The flight displays 102 may be implemented using any of a variety of display technologies, including CRT, LCD, organic LED, dot matrix display, and others. The flight displays 102 may be configured to function to display various information known in the art. The flight displays 102 may be configured to function as one or more of a primary flight display (PFD) 102a or a multifunction display (MFD) 102b. Such PFD 102a and MFDs 102b may be mounted in front of both a pilot and a copilot. The MFD 102b may be mounted between the PFD 102a of the pilot and the PFD 102a of the copilot. Thus, the flight displays 102 may provide instrumentation for the operation of an aircraft. The images shown on the flight displays 102 may include monochrome or color display images (graphical representations) of various avionics data, such as, but not limited to, an indication of altitude of other aircraft, weather conditions, terrain, the altitude and/or location of such information relative to the aircraft, and so on. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. In embodiments, the MFD 102b may be configured to command a radio to tune to a mobile user objective system (MUOS) preset.

The aircraft 100 may include one or more CDUs 104. The CDUs 104 may be configured to function to display various information known in the art. For example, the CDUs 104 may provide an interface between the operator within the cockpit and an aviation management system for displaying flight plan information, network communication information, and the like. The CDUs 104 may be mounted within reach of the operator from the seated position. As depicted, the aircraft 100 includes two of the CDUs 104, although this is architecture is not intended to be limiting. For example, the aircraft 100 may include a single CDU centrally mounted between the operators or may include more than two CDUs. The CDUs 104 may also include one or more other functions. In embodiments, the CDUs 104 are configured to access a MUOS network by one or more radios onboard the aircraft.

Referring now in particular to FIG. 1B. The aircraft 100 may further include an avionics management system 106, a radio 110, and the like. The avionics management system 106 may also be referred to herein as a flight management system. The avionics management system 106 may include one or more functions, as is known in the art. For example, the avionics management system 106 may manage a flight plan of the aircraft 100, determine a position of the aircraft 100, and the like. The avionics management system 106 may include one or more of the MFD 102b, the CDU 104, and the processing unit 108. The various components of the avionics management system 106 may be communicatively coupled in any manner, such as, by a network interface (not depicted). The network interface may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, ethernet connection, serial data bus, and the like. The network interface may further be configured according to any standards known in the art. In embodiments, the avionics management system 106 may also be communicatively coupled with the radio 110. In this regard, the avionics management system 106 may be used to join a MUOS network 114 by way of the radio 110.

The processing unit 108 may also be referred to as a line replaceable unit (LRU), an integrated modular architecture (IMA) cabinet, a flight management computer, and the like. Although not depicted, the processing unit 108 may include one or more processors and memory maintaining program instructions, which may be used to execute any of the various functions described herein.

The radio 110 may generally include any radio known in the art. In embodiments, the radio 110 is configured to communicate with a mobile user objective system (MUOS) network 114. The radio 110 may communicate with the MUOS network 114 by a satellite communication (SAT-COM) waveform. To establish and/or maintain communication with the MUOS network 114, the radio 110 may include one or more payloads and the like. For example, the radio 110 may include a MUOS communication security (COMSEC) payload 112. The MUOS COMSEC payload 112 is loaded on to the radio 110 outside of the avionics management system 106. The MUOS COMSEC payload 112 may then be maintained in a memory of the radio 110. The MUOS COMSEC payload 112 may include cryptographic keys, security parameters, authentication data, and the like for establishing a communication link with the MUOS network 114. The avionics management system 106 may include one or more security requirements, as will be described further herein. For example, the avionics management system 106 may include a PIN security feature. The security requirements may reduce a likelihood of a bad actor gaining access to the MUOS network 114 by way of the radio 110.

In embodiments, the radio 110 is configured to zeroize the MUOS COMSEC payload 112 upon receiving a zeroization command from the avionics management system 106. The zeroization may include electronically erasing the cryptographic keys, security parameters, and the authentication data of the MUOS COMSEC payload 112 from the memory of the radio 110. The zeroization may occur by any process, such as, but not limited to, causing the radio 110 to overwrite the data of the MUOS COMSEC payload 112 with zeroes.

Figure 2:
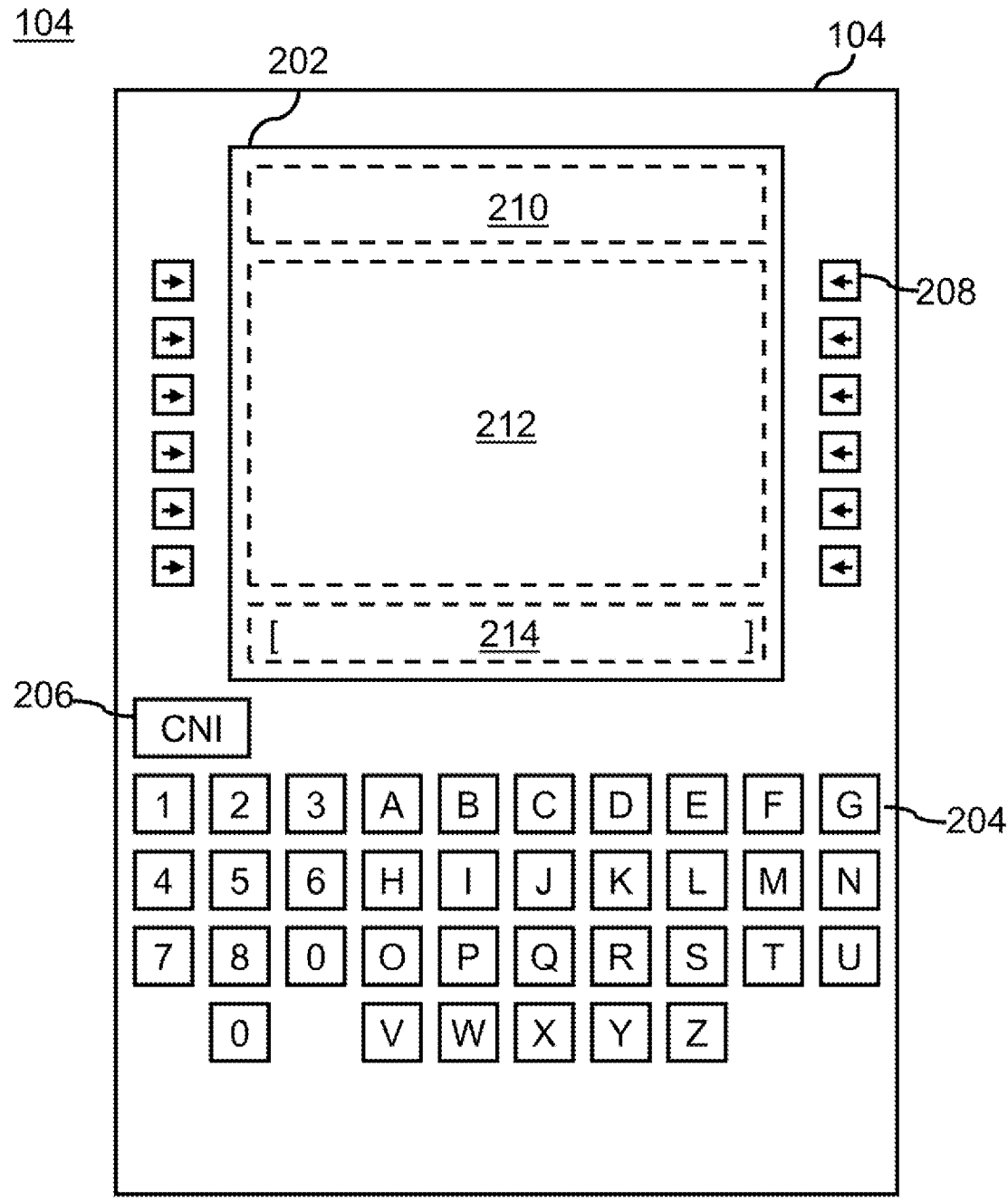
FIG. 2 depicts a front view of a control display unit, in accordance with one or more embodiments of the present disclosure.

Referring now to FIG. 2, the control display unit 104 is described in accordance with one or more embodiments of the present disclosure. The control display unit 104 may include one or more components, such as, but not limited to, a display 202, a keyboard 204, one or more function keys 206, one or more line select keys 208, and the like. The configuration of the CDU 104 depicted in FIG. 2 is exemplary, and is not intended to be limiting as to the placement and arrangement of the various components.

The display 202 may be implemented using any of a variety of display technologies, including CRT, LCD (e.g., an active-matrix LCD (AMLCD)), organic LED, dot matrix display, and others). The display 202 may be separated into one or more regions. For example, the display 202 may include a region 210, a region 212, and a region 214. The region 210 may be provided for displaying annunciations, prompts, status messages, current screen information, and the like. The region 212 may be provided for displaying lines of options which may be selected by a corresponding line-select key 208. For example, the line-select keys 208 may be mounted around a bezel of the display 202, for selecting one or more lines displayed in the region 212. The bottom region 214 may be provided for displaying scratchpad messages and for displaying an input from the keyboard prior to entry. The region 210, the region 212, and the region 214 may be rearranged while still achieving the functionality described herein.

The keyboard 204 may be provided for allowing an operator to provide an input to the CDU 104. The input by the keyboard 204 may be displayed on the region 214, such that the region 214 acts as a scratchpad. In embodiments, the keyboard 204 is an alphanumeric keyboard including alphabetical characters and numerical characters, although this is not intended to be limiting. It is further contemplated the keyboard 204 may be an alphabetical keyboard or a numerical keyboard. Furthermore, the keyboard 204 may generally include any arrangement of characters known in the art. For example, the alphabetical characters may be provided in alphabetical order. The keyboard 204 may generally be configured to receive any input. For example, the input may include a personal identification number (PIN) for accessing various MUOS feature sets, as will be described further herein.

The CDU 104 may include the function keys 206. In embodiments, the function keys 206 include a key for Communications, Navigation, and Identification (CNI) which may also be referred to as a CNI key. The CNI key is a hard key which may be physically labeled with CNI. The CNI key causes the CDU 104 to display a communication page, which may also be referred to as a Comm1 Control page, and the like. The CDU 104 may include additional function keys which are not shown in the interest of clarity.

Figure 3:
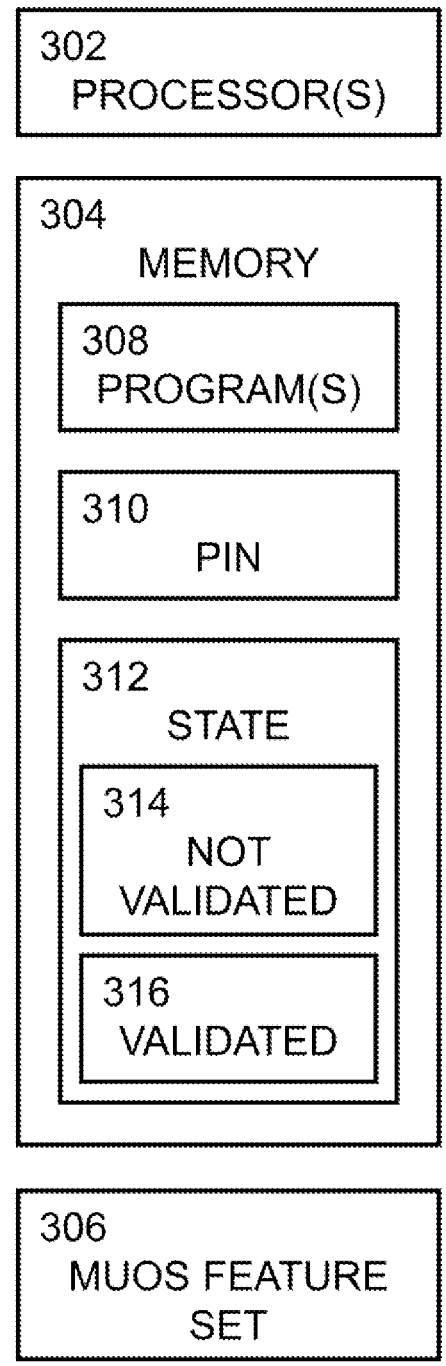
FIG. 3 depicts a simplified block diagram of an avionics management system including a personal identification number security feature, in accordance with one or more embodiments of the present disclosure.

Referring now to FIG. 3, the avionics management system 106 is further described, in accordance with one or more embodiments of the present disclosure. In embodiments, one or more of the MFD(s) 102b, the CDU(s) 104, and/or the processing unit(s) 108 includes one or more processor(s) 302 and/or a memory 304. The avionics management system 106 may further include a mobile user objective system (MUOS) feature set 306.

The processor 302 may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

The memory 304 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, control display unit, an integrated modular avionics (IMA) controller, a line replaceable unit, or the like. In an alternative embodiment, the memory may be located remotely with respect to the physical location of the processor. In another embodiment, the memory maintains program instructions 308 for causing the processor(s) to carry out the various steps described through the present disclosure.

The MUOS feature set 306 may include displaying a MUOS presets page. The MUOS presets page may include one or more MUOS frequency presets. When the MUOS frequency preset is selected, the avionics management system 106 may send a command to the radio causing the radio 110 to establish communication with the MUOS network 114. The MUOS feature set 306 may include tuning to a MUOS preset. For example, the operator may command the radio to tune to a MUOS preset via the MFD 102b or the CDU 104. Preventing the MFD 102b or the CDU 104 from displaying the MUOS presets page until the system state is PIN validated may be advantageous in preventing a potential bad actor from viewing the MUOS presets and from sending commands to the radio for establishing communication with the MUOS network.

In embodiments, a set of security requirements are applied to the MUOS feature set 306 of the Avionics Management System 106. The security requirements may include validating a personal identification number (PIN) input by the operator. The avionics management system 106 may receive an input of the PIN 310 and validate the PIN. The input PIN may then be validated against the PIN 310 stored in memory. The MUOS feature set 306 may then be accessible by a user with the PIN 310, such as displaying the MUOS presets, tuning to the MUOS preset, and the like. Providing access by the PIN 310 may reduce a security risk of a bad actor gaining access to the MUOS network 114.

The aviation management system 106 may manage and record a system state 312 based on the validation of the PIN. Depending upon the system state 312, the aviation management system 106 may allow or prevent the MFD 102b and/or the CDU 104 from accessing the MUOS feature set 306. The system state 312 may be maintained in a PIN not validated 314 system state. The PIN not validated 314 system state may also be referred to herein as not validated, or MUOS PIN not validated. While the system state is PIN not validated 314, all MUOS functions are disabled and not accessible by the MFD 102b and/or the CDU 104. The system state 312 may also be maintained in a PIN validated 316 system state. The PIN validated 316 system state may also be referred to herein as validated or MUOS PIN validated. While the system state is MUOS PIN validated 316, all MUOS function are functional and accessible by the MFD 102b and/or the CDU 104. Once the input PIN has been validated, the system state 312 may be changed from the PIN not validated 314 to the PIN validated 316, thereby allowing for communication by way of the MUOS network 114.

In some instances, the PIN 310 may be considered to provide two-factor authentication to the MUOS feature set 306. The two factors may include the aircraft and the PIN. Although the operator may know the PIN 310, the operator may be unable to access the MUOS network 114 without also controlling the CDU 104 and the radio 110. Similarly, although the operator may be in physical possession of the CDU 104 and the radio 110, the operator may be unable to access the MUOS network 114 without also knowing the PIN 310. In this regard, without the various components of the aircraft (e.g., the radio 110 and the avionics management system 106), together with the PIN 310, a bad actor may be unable to access the MUOS network 114.

The PIN 310 may also be referred to herein as a MUOS PIN. The PIN 310 may include one or more characteristics. The PIN 310 may be a numeric PIN, an alphanumeric PIN, and the like. The PIN 310 may include a minimum number of alphanumeric characters (A-Z and 0-9), such as 6 alphanumeric characters, for example. The PIN 310 may include a maximum number of alphanumeric characters (A-Z and 0-9), such as 12 alphanumeric characters, for example.

In embodiments, the display 202 of the CDU 104 is configured to display a prompt for inputting the PIN 310. For example, the display 202 may include a MUOS login page. At the MUOS login page, the operator may input the PIN by the keyboard 204.

In embodiments, the avionics management system 106 detects an attempt to access the MUOS feature set 306, prevents from accessing the MUOS feature set 306 while in the not validated state, and prompts for the PIN 310 in response to detecting the attempt. For example, the attempt to access the MUOS feature set 306 may include one or more of attempting to access the MUOS presets page, scrolling from another communication presets page to the MUOS presets page, and/or manually tuning to a MUOS preset. The prompt may include causing a display of the CDU 104 to change a MUOS login page. In this regard, the display of the CDU 104 may be changed to the MUOS login page in response to detecting an attempt to access a MUOS feature set while the system state 312 is PIN not validated 314. Prompting for the PIN in response to detecting the attempt to access the MUOS feature set may be advantageous in reducing operator nuisance. For instance, the operator may be able to access any number of the other feature sets of the MFD 102b, the CDU 104, and/or the radio 110 without needing to input the PIN. Once the operator attempts to access the MUOS feature set, the operator is then required to input the PIN causing the system state 312 to change to PIN validated 316 before being able to access the MUOS feature set. Although the avionics management system 106 is described as prompting for the PIN 310 in response to detecting an attempt to access the MUOS feature set 306, this is not intended as a limitation of the present disclosure. For example, the MUOS login page may be displayed when the CDU 104 is turned on. However, requiring the PIN 310 every time the CDU 104 is turned on may require additional operator work, even if the operators do not require access to the MUOS network 114.

In embodiments, the PIN 310 may include a default PIN. The default PIN may be preloaded by an Operational Flight Program (OFP). For example, the default PIN may be defined in development. During initialization, the program instructions 308 cause the CDU 104 to prompt the operator to enter the default PIN. Once the default PIN is entered, the program instructions 308 cause the CDU to prompt the operator to enter a new PIN and confirm the new PIN. Providing the confirmation is advantageous in ensuring the operator knows the PIN that has been entered. Consider, for example, FIGS. 5A-5D. In embodiments, the avionics management system 106 is configured to change the PIN 310. Consider, for example, FIGS. 9A-9D.

In embodiments, the avionics management system 106 is configured to handle a recovery after one or more failed login attempts. For example, the input PIN may be different than the PIN 310 maintained in memory. In response to comparing the input PIN against the PIN 310 thereby determining the input PIN is invalid, the avionics management system 106 may store a number of remaining attempts in the memory 304. Until the remaining attempts reaches zero, the operator may be prompted for inputting the PIN. Consider, for example, FIGS. 7A-7D.

In embodiments, the avionics management system 106 is configured to handle a failed recovery after one or more failed login attempts. The number of remaining attempts may reach zero. After reaching zero remaining attempts, the avionics management system 106 may reset the PIN to the manufacturer default PIN, set the system state 312 to PIN not validated 314, and/or send a zeroization command to the radio 110. For example, entering the PIN incorrectly 10 times shall cause the PIN to be reset to the manufacturer default and zeroization of the MUOS communication security (COMSEC) payload. Consider, for example, FIGS. 8A-8D.

Although the avionics management system 106 is described as maintaining the remaining attempts, this is not intended as a limitation of the present disclosure. For example, the avionics management system 106 may maintain a number of invalid attempts and a number of allowable attempts. The number of remaining attempts may be similar to the number of invalid attempts and the number of allowable attempts in that the number of remaining attempts may be determined by subtracting the number of allowable attempts against the number of invalid attempts. Failing to validate the alphanumeric input causes the processor to increase the number of invalid attempts stored in memory. Once the number of invalid attempts is equal to the number of allowable attempts, the zeroization command may then be sent.

In embodiments, the PIN not validated 314 may be a default state when the CDU is cold started. Cold starting may also be referred to as cold booting. Cold starting may include booting or powering up the CDU from a state in which the CDU is powerless or powered off. In contrast, warm starting may include booting or powering up the CDU from a state in which the CDU receives power. For example, the warm starting may include not discarding information stored in volatile memory, while the cold start may include discarding information stored in volatile memory. Applying to an architecture including at least two CDUs, the PIN not validated 314 will trigger after all CDUs are cold started. For example, an architecture for the avionics management system 106 may include two of the CDUs. The PIN not validated 314 will be set when all of the CDUs are detected to be powered off.

In embodiments, the avionics management system 106 may maintain the system state 312 in the PIN validated 316 while at least one of the CDUs remains powered on. Once all of the CDUs are powered off, the avionics management system 106 may then change the system state 312 to PIN not validated 314, requiring the user to then revalidate the PIN when cold starting the CDUs. Although the avionics management system 106 is described as maintaining the system state 312 in the PIN validated 316 while at least one of the CDUs remains powered on, this is not intended as a limitation of the present disclosure. In embodiments, the system state 312 may be set to PIN not validated 314 after one of the CDUs is cold started and one of the CDUs remains power on. However, if the system state 312 is set to PIN not validated 314 after one of the CDUs is cold started in an architecture that includes two or more CDUs, that could be a nuisance to an operator. For example, the system state 312 may be PIN validated 316 with a first and second CDU power on. The first CDU is then power cycled (e.g., turned off and turned on). The second CDU becomes the master. However, the power cycling also causes the system state 312 to be set to PIN not validated 316 causing the second CDU to lose connectivity to the MUOS feature set 306. In this example, it is unlikely that the second CDU has been removed and taken over by a bad actor, given that the second CDU has not been powered off. Thus, it may be desirable to maintain the system state 312 in the PIN validated 316 while at least one of the CDUs remains powered on.

In embodiments, the PIN 310 and the system state 312 are maintained on the CDU 104. The CDU 104 may then validate the PIN 310 internally, without requiring external communication to other components of the avionics management system 106. Although the CDU is described as executing various functions, this is not intended as a limitation. In this regard, any one or more components of the avionics management system 106 may include a processor executing program instructions for implementing the various functions described herein. For example, the processing unit 108 may generally be configured to execute any of the functions to which the CDU is described as executing. The processing unit may thus provide processing for the CDU, in a distributed or federated manner.

Figure 4:
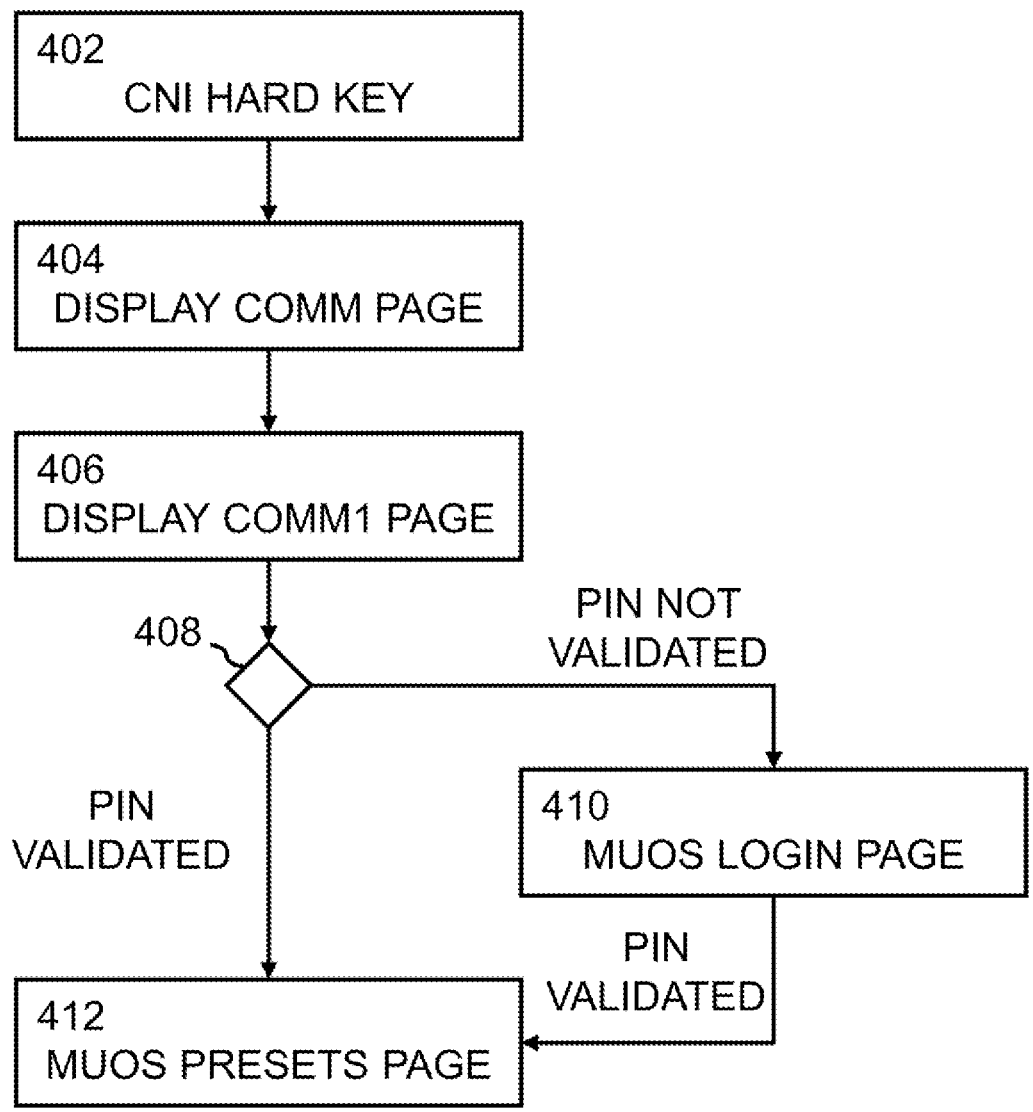
FIG. 4 depicts a flow diagram of a method, in accordance with one or more embodiments of the present disclosure.
Figure 5A:
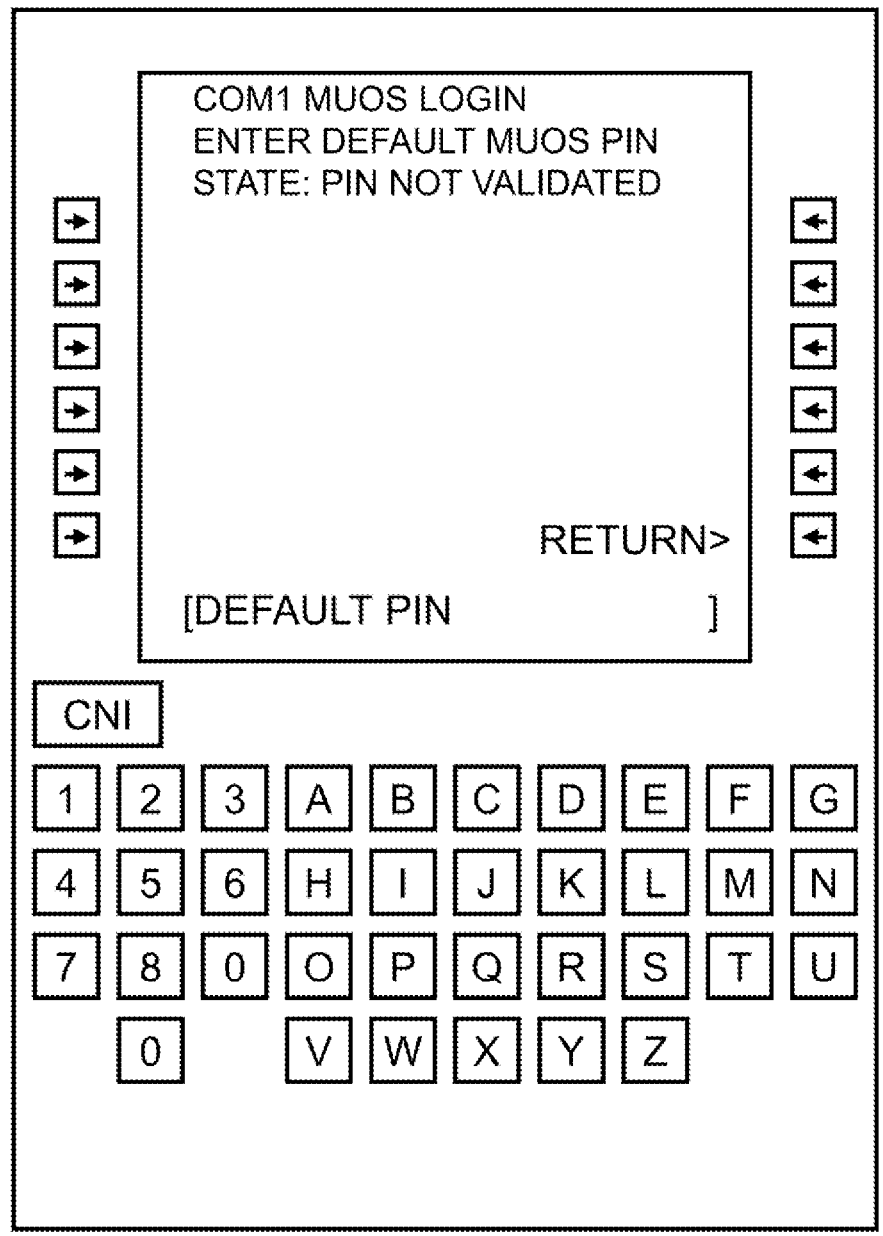
FIGS. 5A-5D depict a front view of a control display unit showing a use case of changing a default personal identification number, in accordance with one or more embodiments of the present disclosure.
Figure 5B:
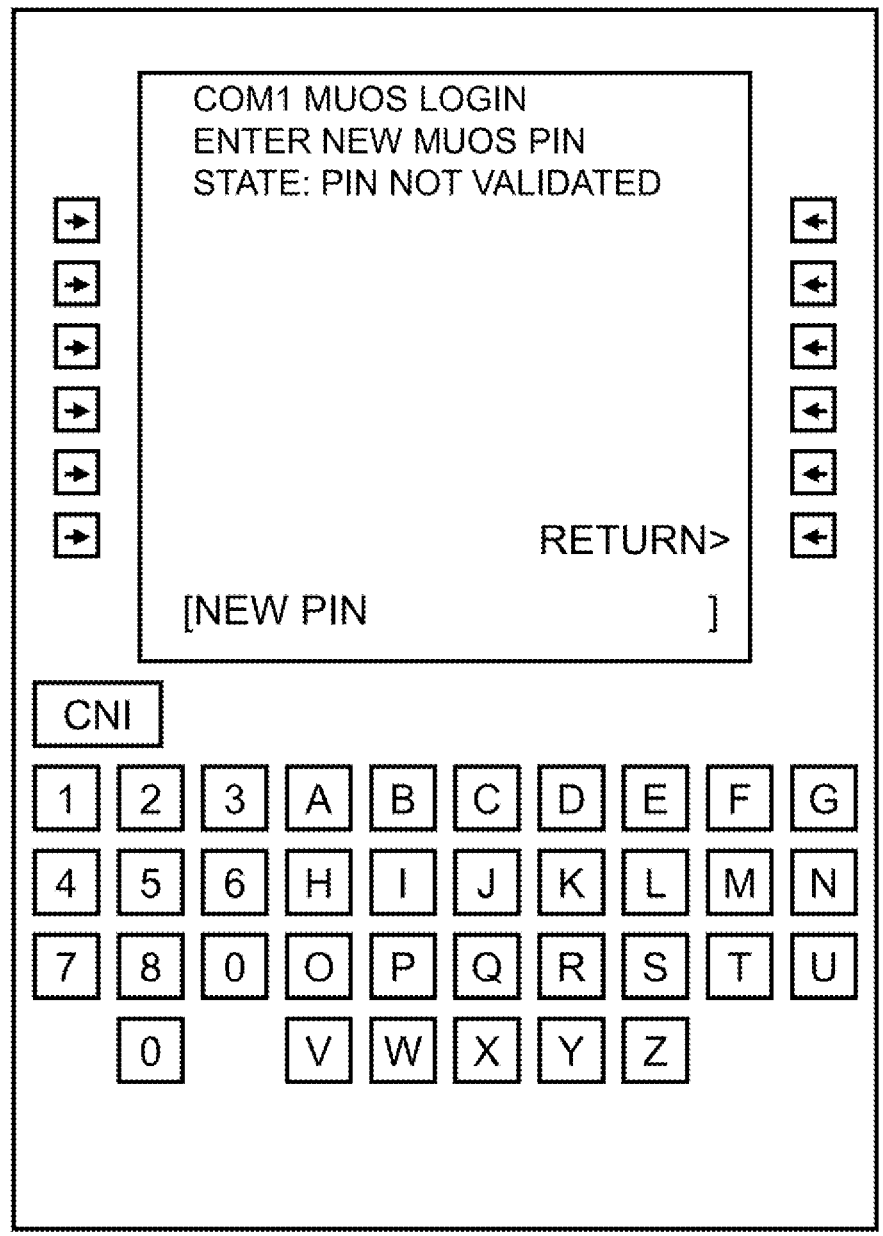
Figure 5C:
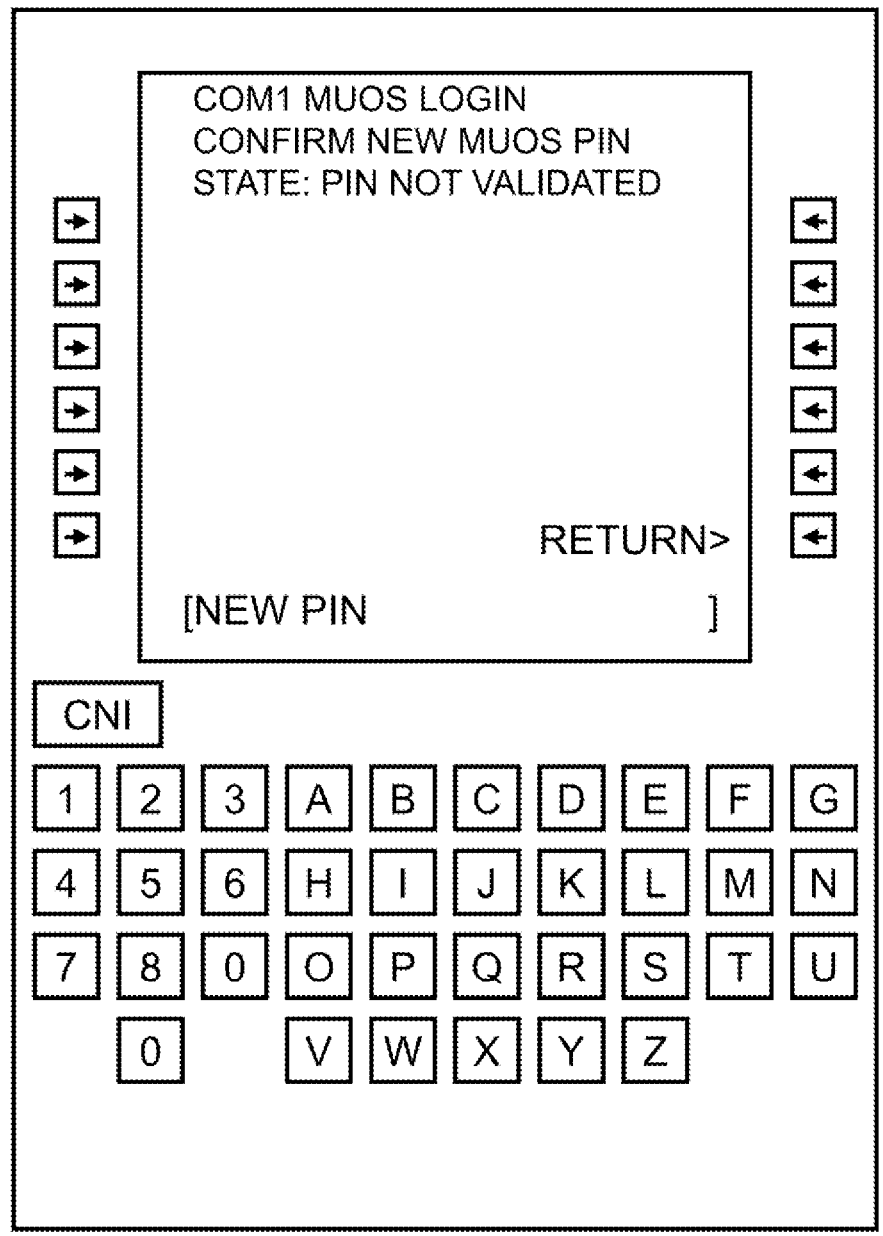
Figure 5D:
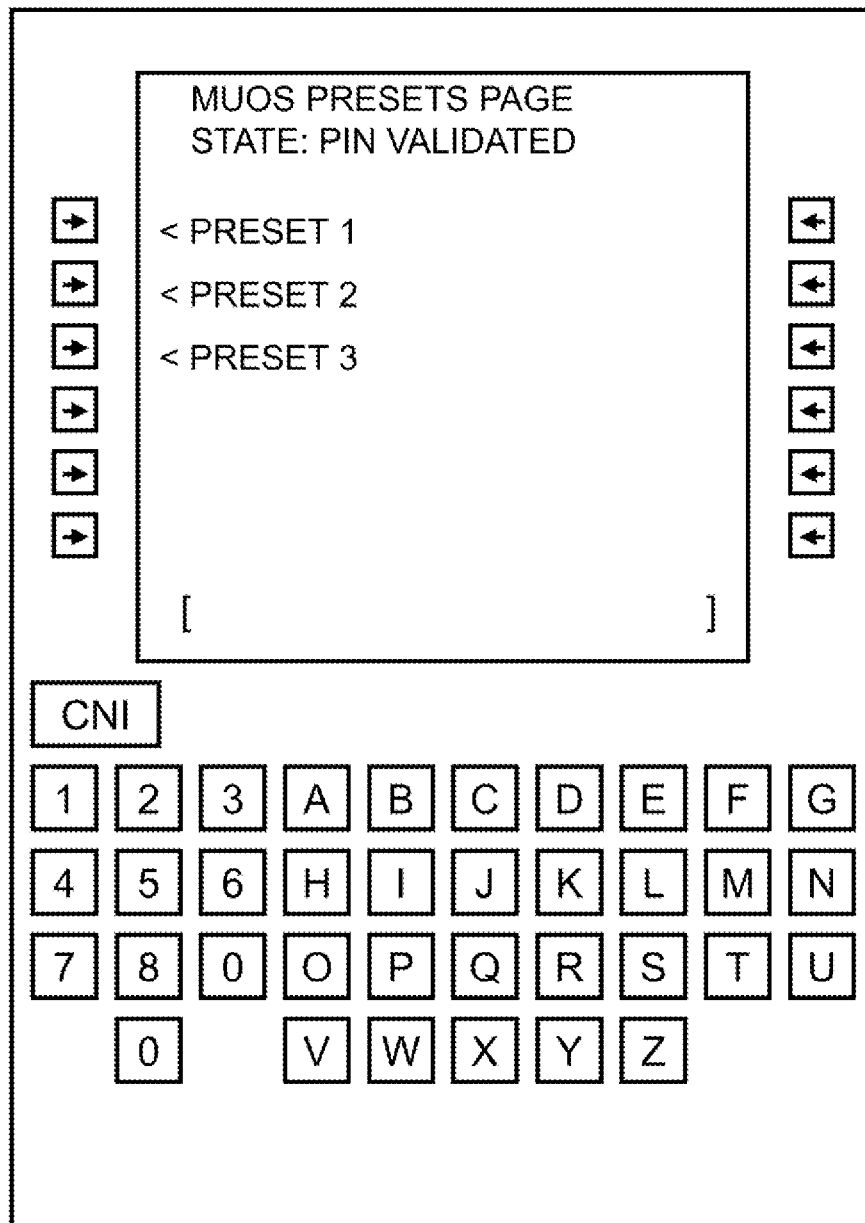

Referring now to FIG. 4, a flow diagram of a method 400 is described, in accordance with one or more embodiments of the present disclosure. The embodiments and the enabling technology described previously herein in the context of the aircraft 100 should be interpreted to extend to the method 400. It is further recognized, however, that the method 400 is not limited to the aircraft 100. Similarly, the embodiments and enabling technology of the method 400 should be interpreted to be implemented by the processors of the aircraft 100.

In a step 402, a CNI hard key is pressed. In a step 404, the CDU displays a COMM page in response to the CNI hard key being pressed. In a step 406, the CDU displays a COMM1 control page in response to a line-select key being pressed on the CDU. The line-select key may correspond to an option of the COMM1 control page. From the COMM1 control page, the operator attempts to access a MUOS feature set by one or more of selecting a like-select key for the MUOS presets page, scrolling from another communication presets page to the MUOS presets page, and/or manually tuning to a MUOS preset. In a step 408, the avionics management system detects the attempt to access the MUOS feature set and determines whether the system state is PIN validated or PIN not validated. The step 408 may include a branch depending upon the system state. In a step 410, a first branch from the Comm1 Control page is provided. The system detects the system state is PIN not validated and prevents the CDU from accessing the MUOS feature set. A MUOS login page is displayed on the CDU. The operator then inputs the PIN. Once the PIN is validated, the system state is changed to PIN validated and the first branch rejoins with the second branch. In a step 412, the system detects the system state is PIN validated. The system then allows the CDU to access the MUOS feature set, such as displaying the MUOS presets page and/or causing the radio to tune to the MUOS preset. Thus, depending on the system state, the CDU will display different pages and limit the ability to access the MUOS feature set. If the system state is not validated, the CDU will display the MUOS login page. If the system state is validated, the CDU will display the MUOS presets page.

Referring now to FIGS. 5A-5D, a first use case for the CDU is described, in accordance with one or more embodiments of the present disclosure. In the first use case, a default PIN is changed. The system state starts not validated. The display of the CDU may be a COM1 MUOS login page. For example, the CDU may display the COM1 MUOS login page after attempting to tune to a MUOS preset or attempting to access the MUOS presets page. The avionics management system may detect that no PIN is set, other than the default PIN. To change the default PIN, the CDU prompts the operator to enters the default pin. Upon validating the default PIN, the CDU then prompts the operator to enter a new PIN. The CDU then receives the new PIN by the alphanumeric keyboard. The CDU then prompts to confirm the new pin. The CDU then receives the confirmation of the new PIN by the alphanumeric keyboard. If the new PIN is confirmed, the avionics management system updates the PIN 310 and causes the system state to change from not validated to validated. In this example, the CDU displays the MUOS presets page after validation of the PIN.

Figure 6A:
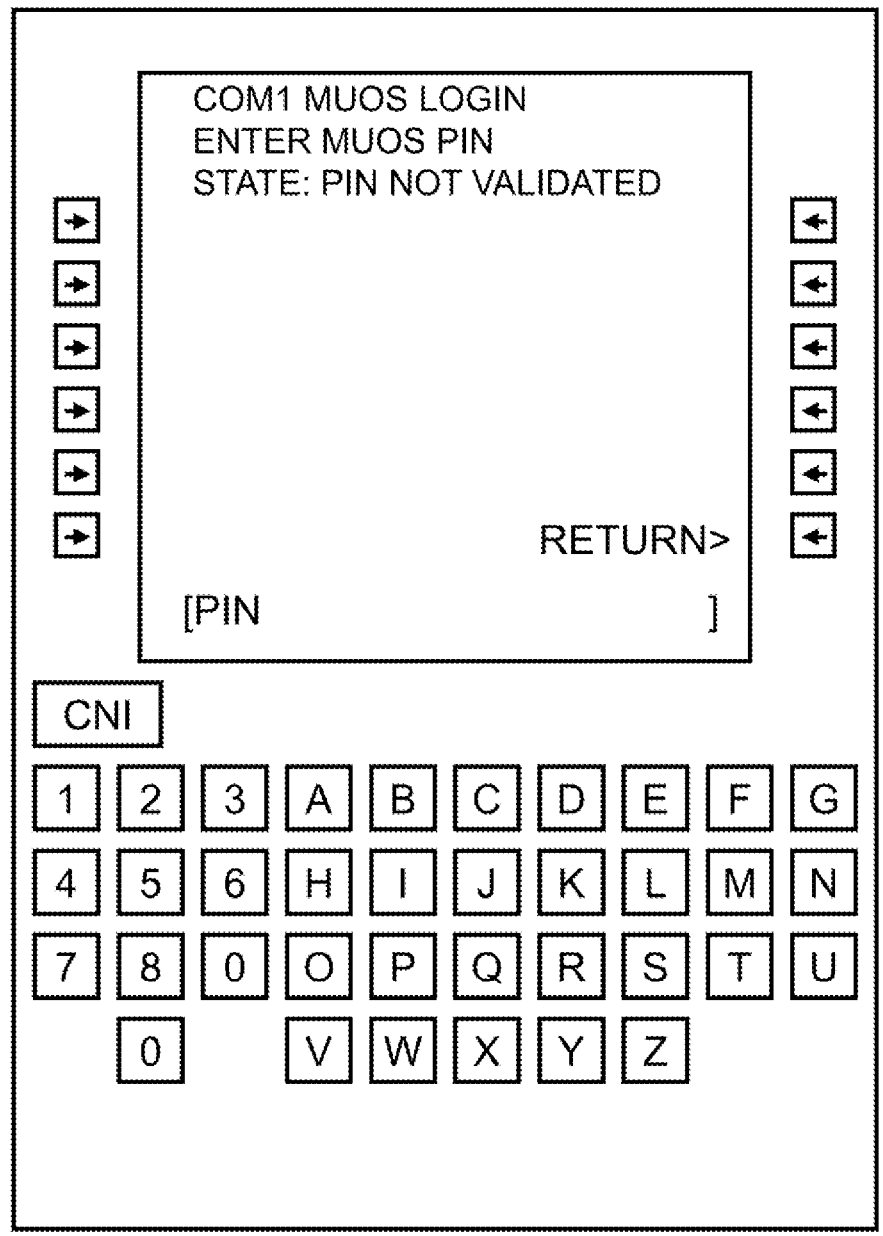
FIGS. 6A-6B depict a front view of a control display unit showing a use case of validating a personal identification number, in accordance with one or more embodiments of the present disclosure.
Figure 6B:
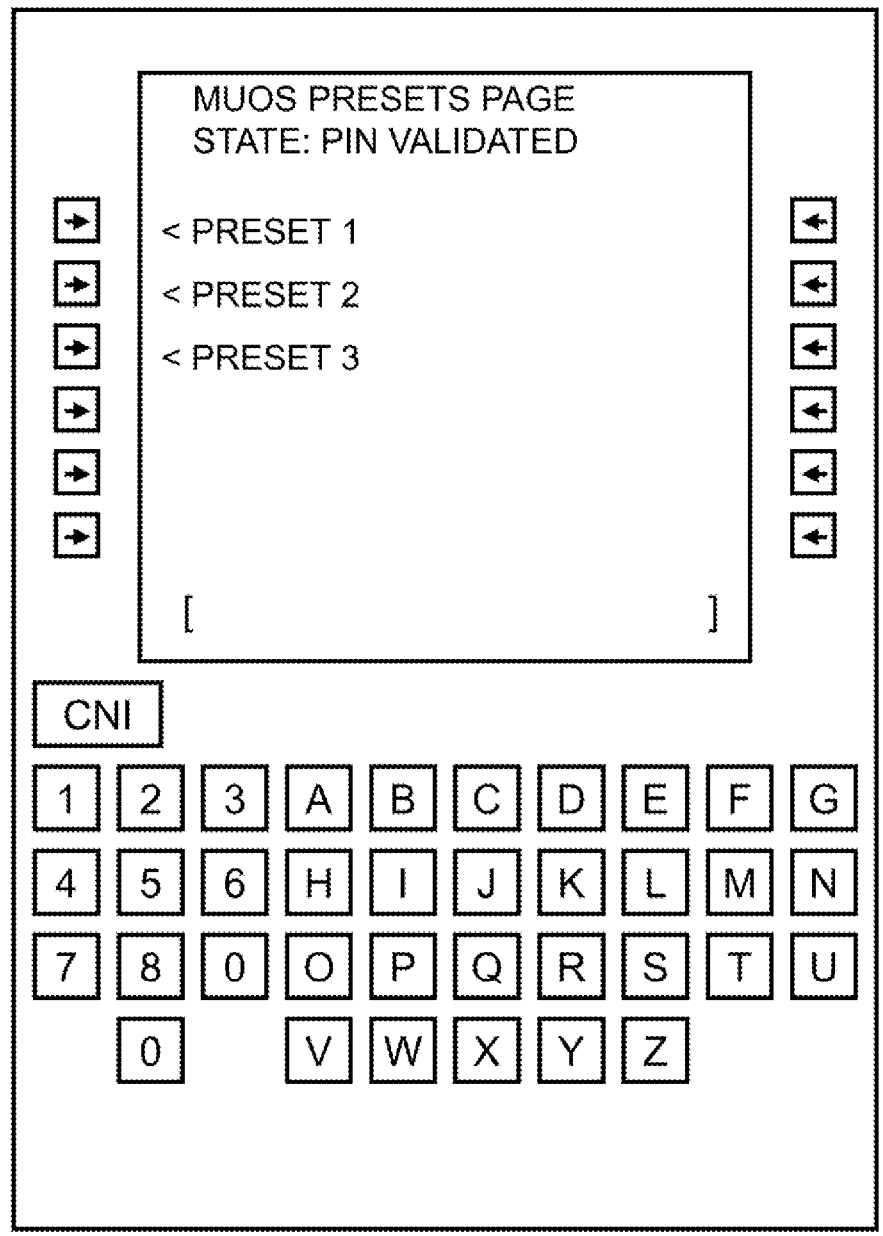
Figure 7A:
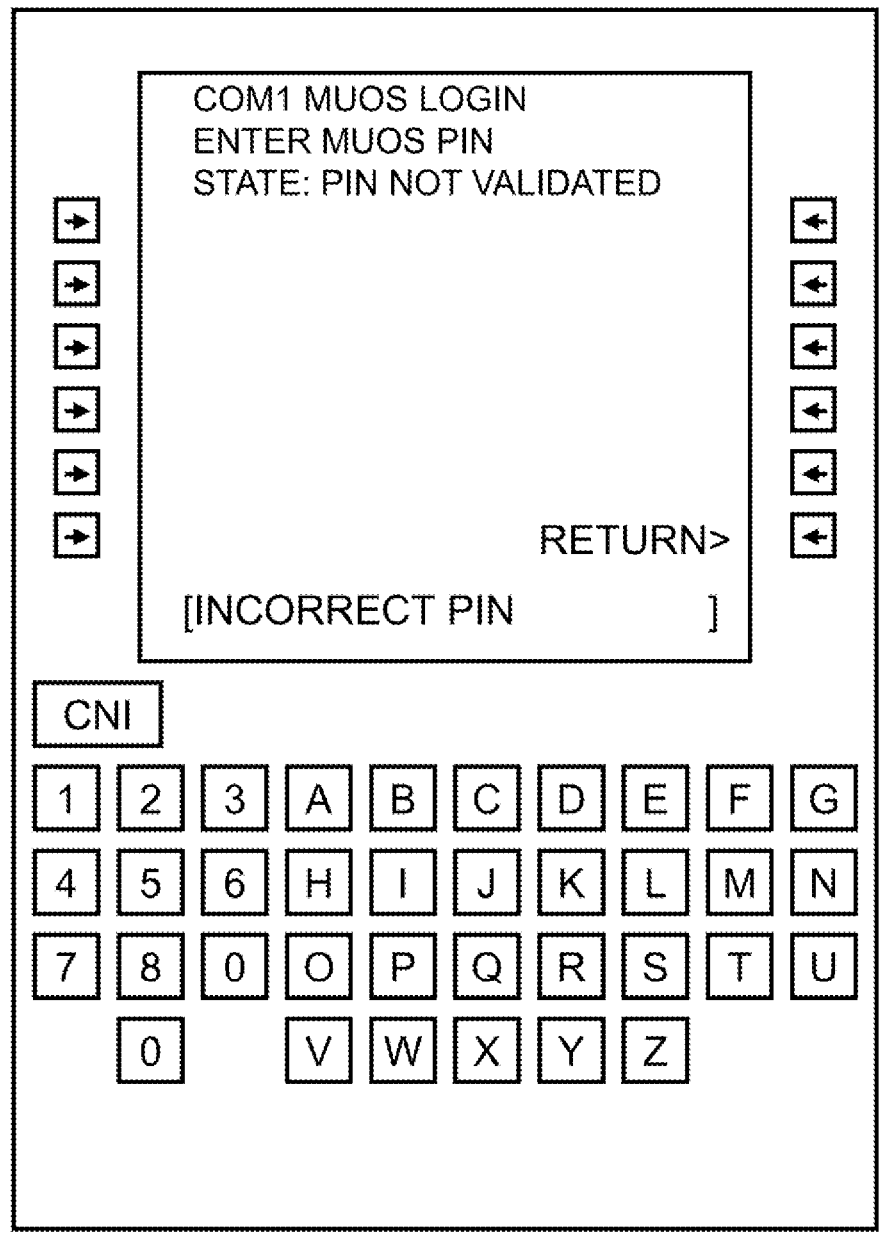
FIGS. 7A-7D depict a front view of a control display unit showing a use case of entering an invalid personal identification number with a recovery, in accordance with one or more embodiments of the present disclosure.
Figure 7B:
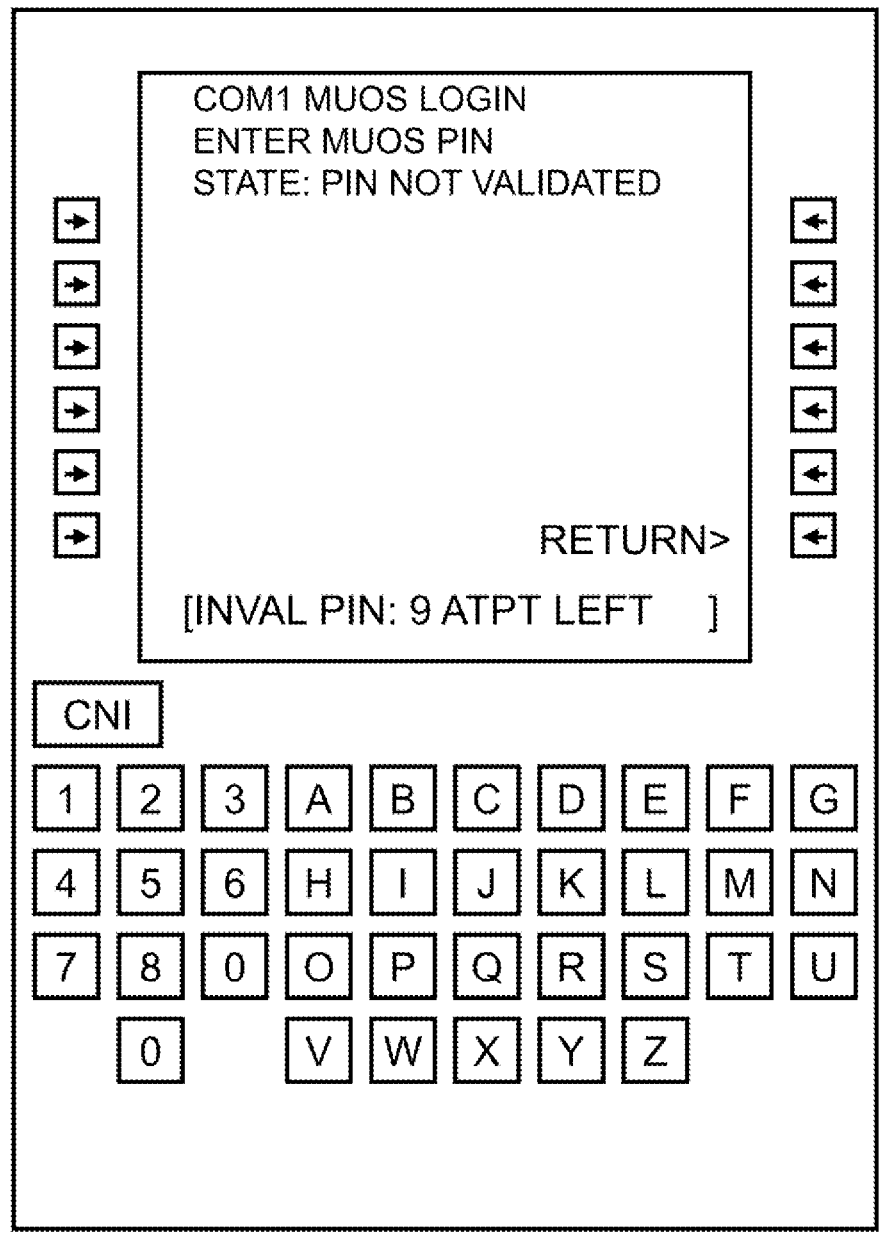
Figure 7C:
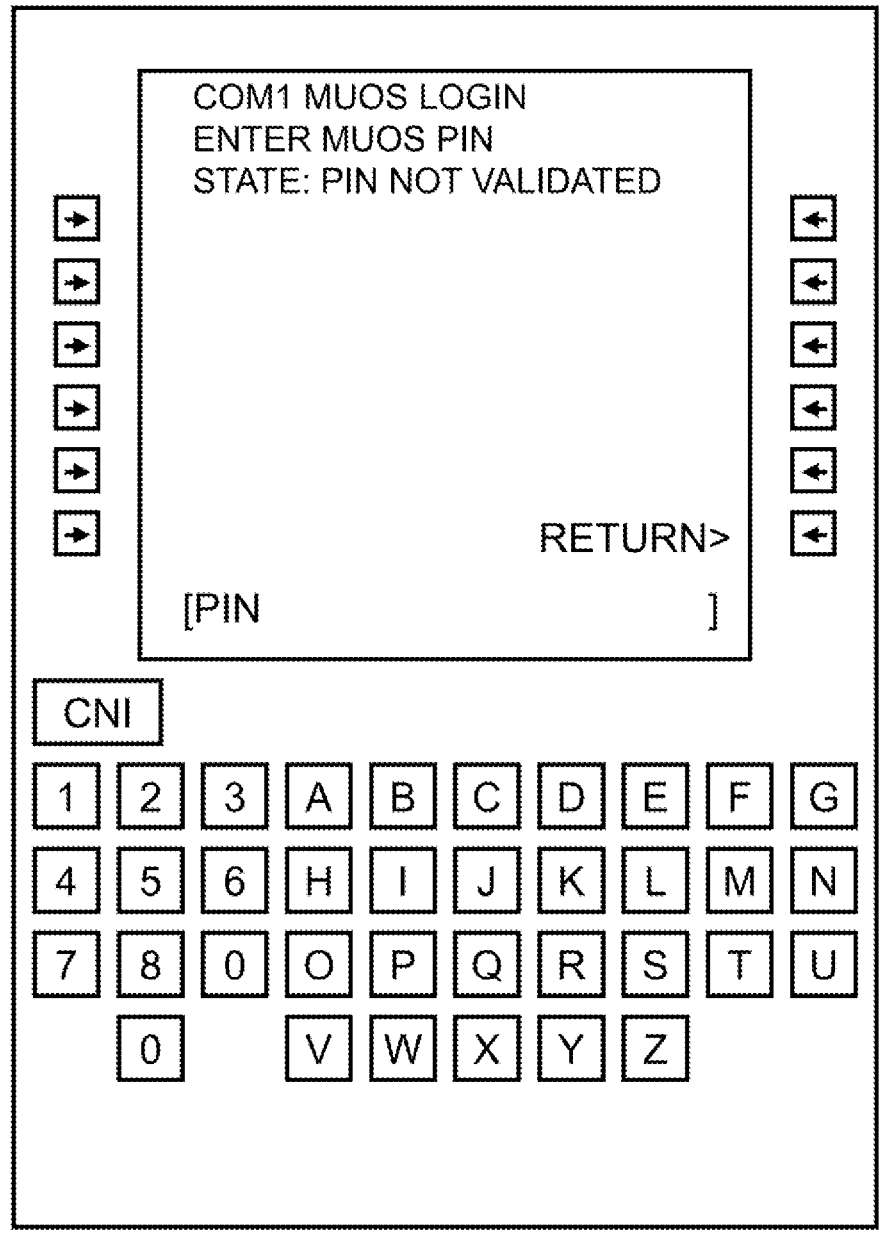
Figure 7D:
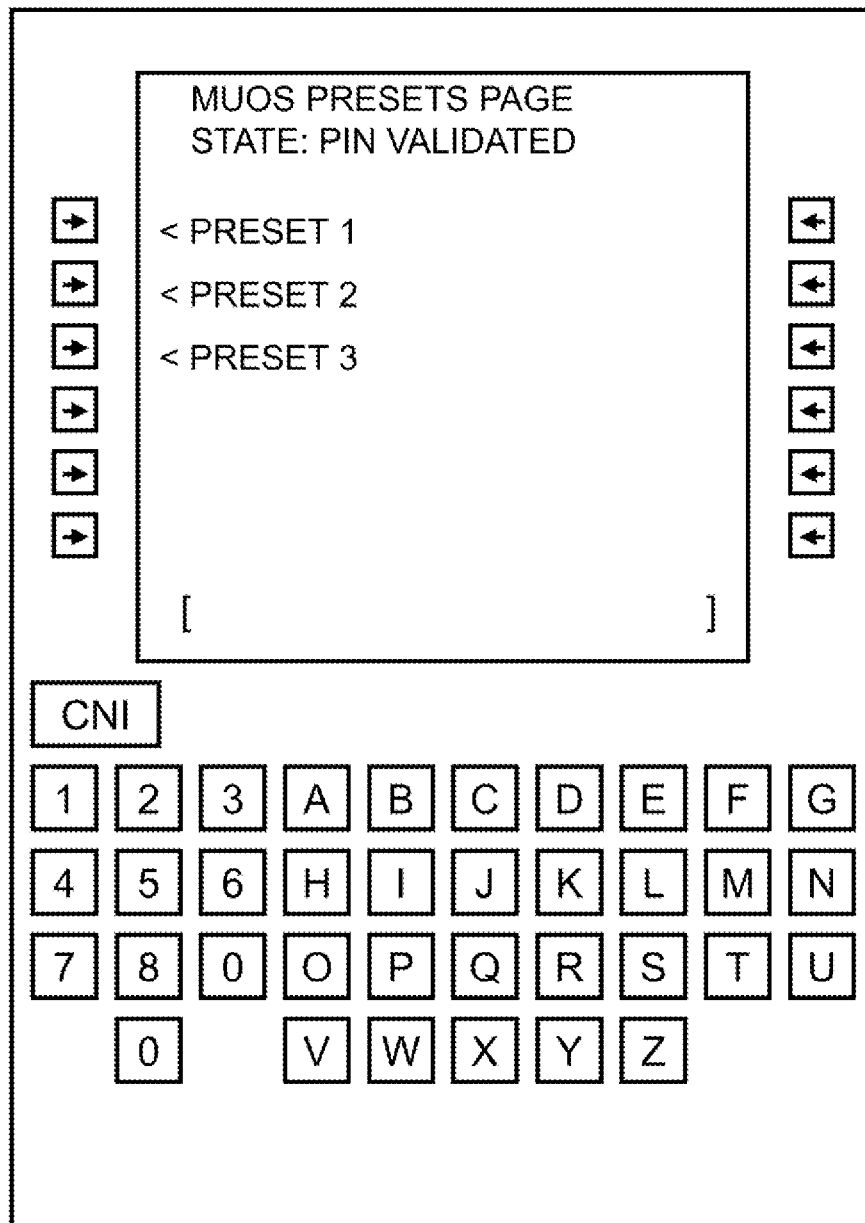

Referring now to FIGS. 6A-6B, a second use case for the CDU is described, in accordance with one or more embodiments of the present disclosure. The second use case may also be referred to as logging in with a PIN. In the second use case, a PIN is used to validate the user. The system state starts not validated. The display of the CDU may be a COM1 MUOS login page. For example, the CDU may display the COM1 MUOS login page after attempting to tune to a MUOS preset or attempting to access the MUOS presets page. The avionics management system may detect that a PIN is set. The CDU prompts the operator to enter the PIN. The avionics management system then receives the PIN by the alphanumeric keyboard and validates the input with a PIN stored in memory. Upon validating the PIN, the avionics management system causes the system state to change from not validated to validated. In this example, the CDU displays the MUOS presets page after validation of the PIN.

Referring now to FIGS. 7A-7D, a third use case for the CDU is described, in accordance with one or more embodiments of the present disclosure. The third use case may also be referred to as inputting an invalid PIN with recovery. The system state starts not validated. In the third use case, an invalid PIN is entered by the keyboard. The avionics management system detects the invalid PIN is invalid by comparing the invalid PIN with the correct PIN maintained in memory. The system state remains not validated. The number of attempts remaining is decreased. The scratchpad of the CDU displays a message indicating the PIN was invalid and the number of remaining attempts, such as "INVAL PIN: 9 ATPT LEFT". While the number of attempts remaining is one or greater, the CDU continues to prompt the operator to enter the PIN in a recovery step. The correct PIN is entered and is validated against the PIN stored in memory. The system state is then changed from PIN not validated to PIN validated, and the CDU is then allowed to access the MUOS feature set. In this example, the CDU displays the MUOS presets page after validation of the PIN.

Figure 8A:
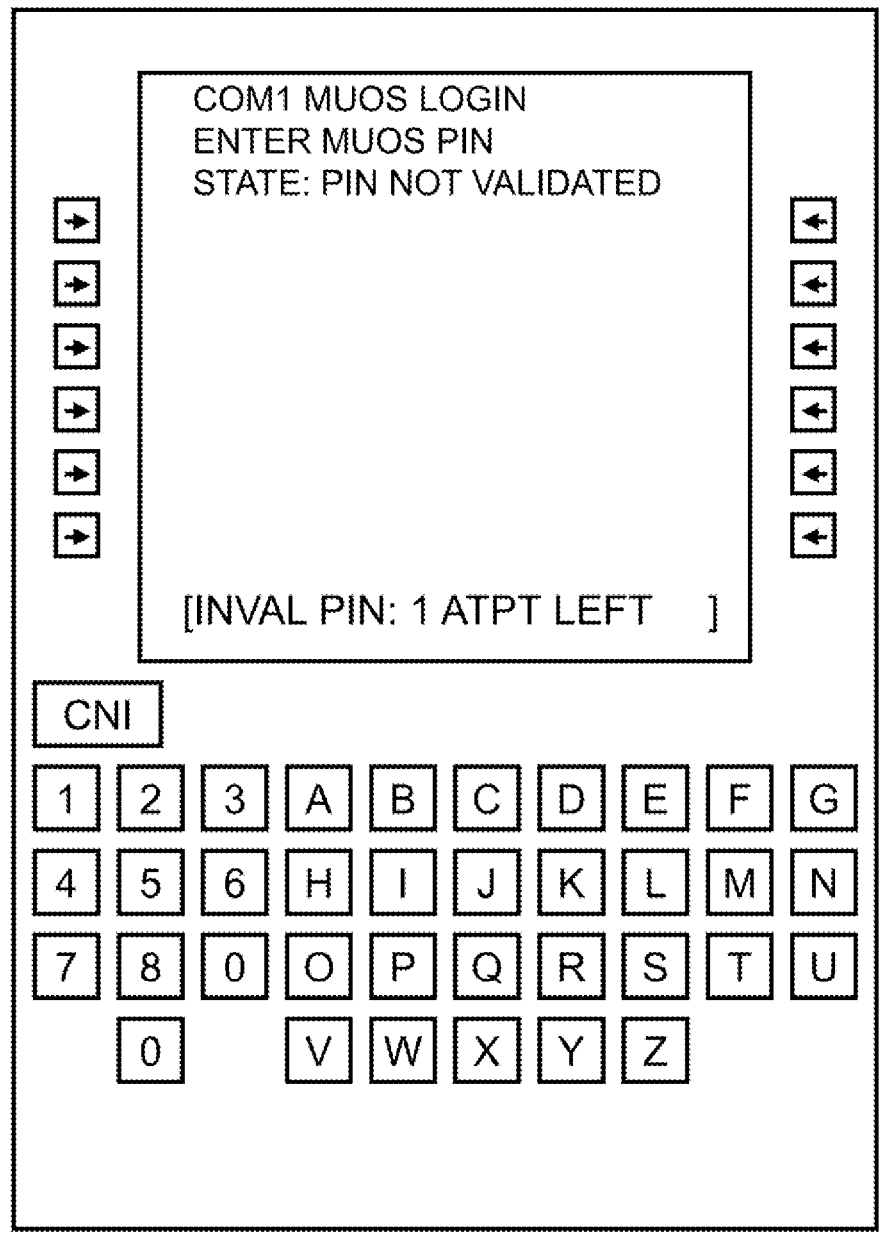
FIGS. 8A-8C depict a front view of a control display unit showing a use case of entering an invalid personal identification number without a recovery, in accordance with one or more embodiments of the present disclosure.
Figure 8B:
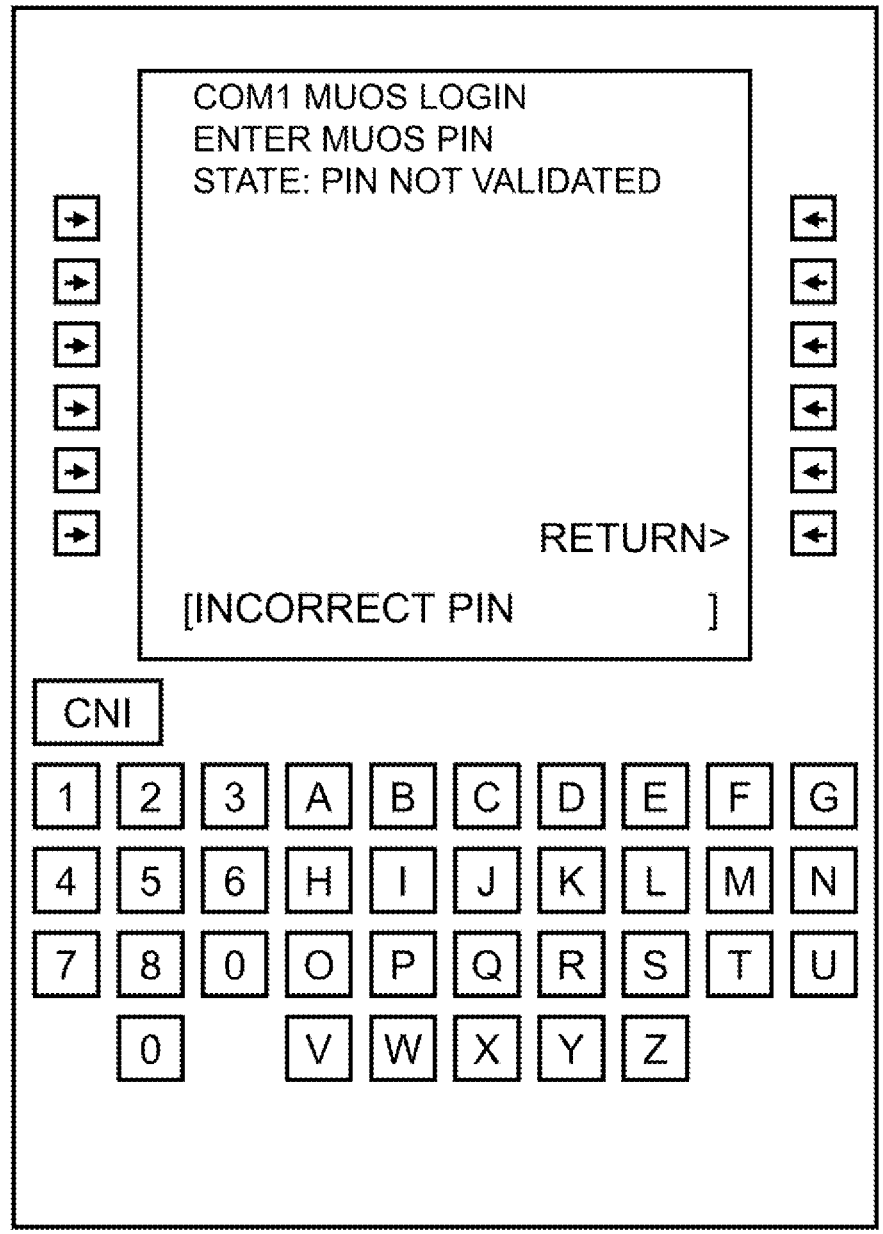
Figure 8C:
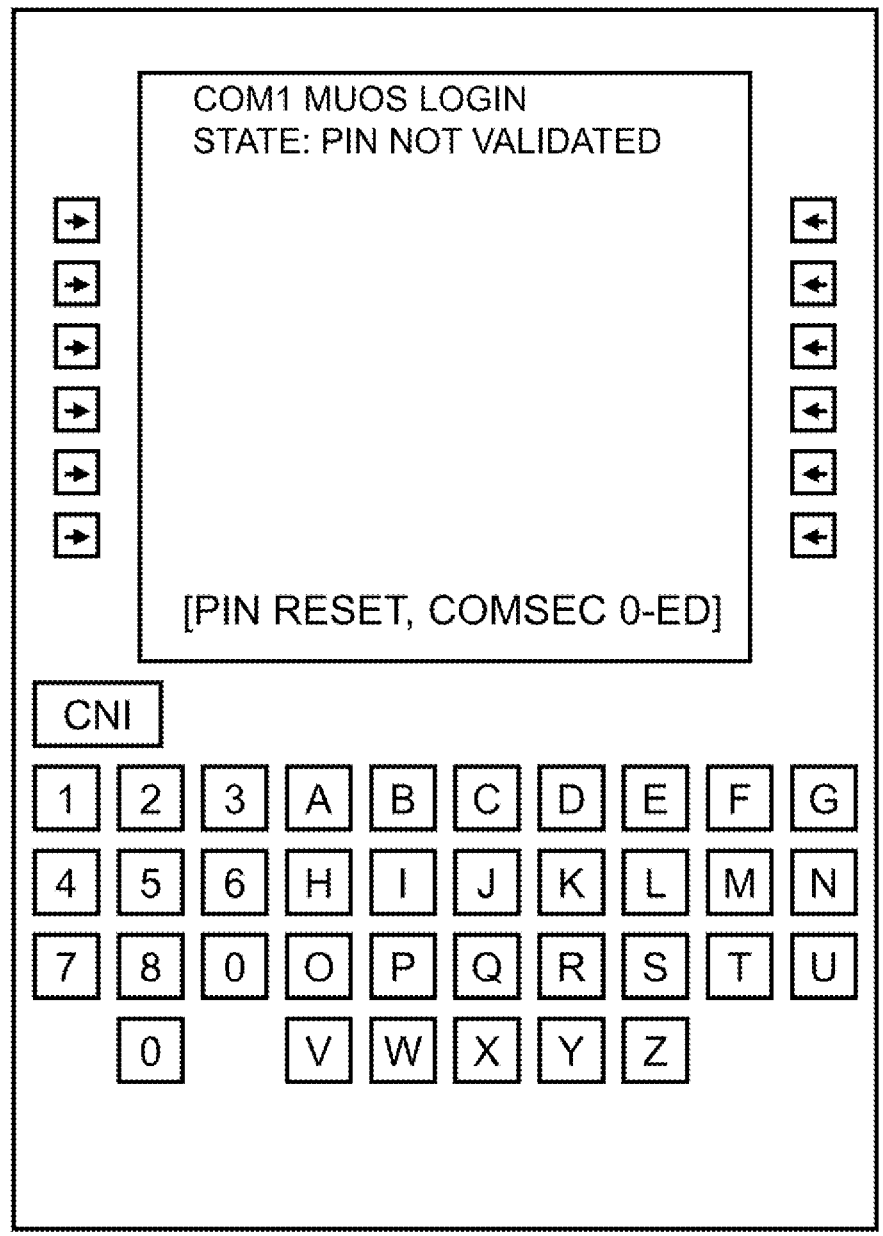
Figure 9A:
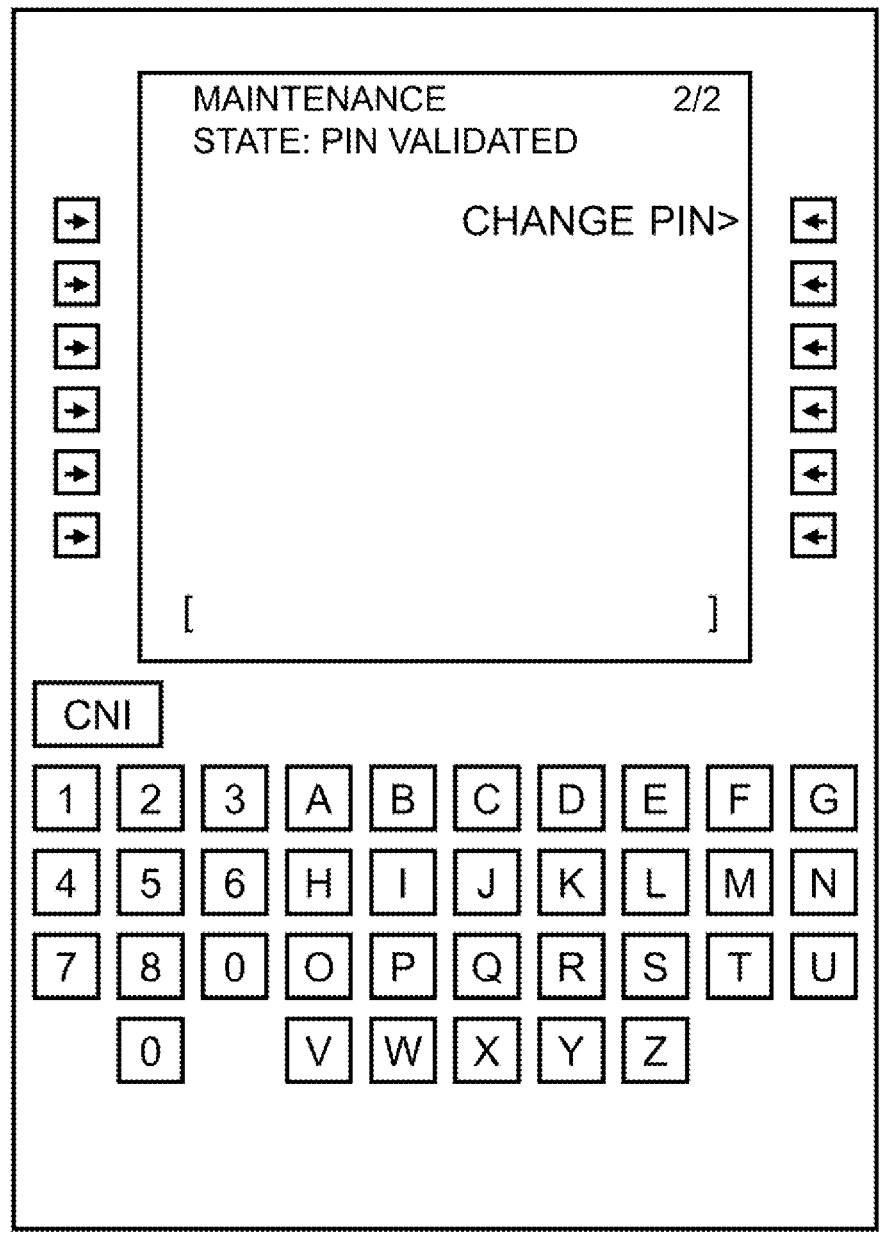
FIGS. 9A-9D depict a front view of a control display unit showing a use case of changing a personal identification number to a new personal identification number, in accordance with one or more embodiments of the present disclosure.
Figure 9B:
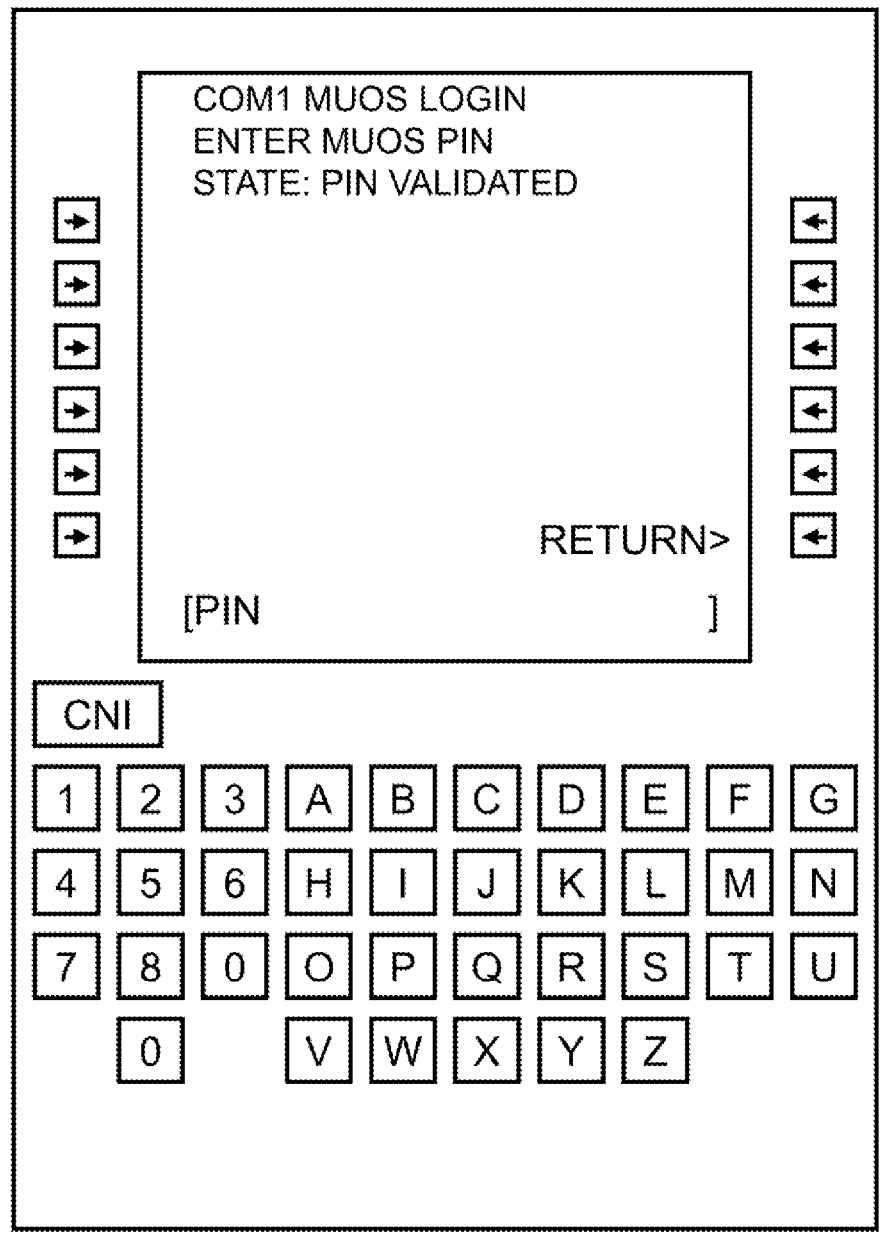
Figure 9C:
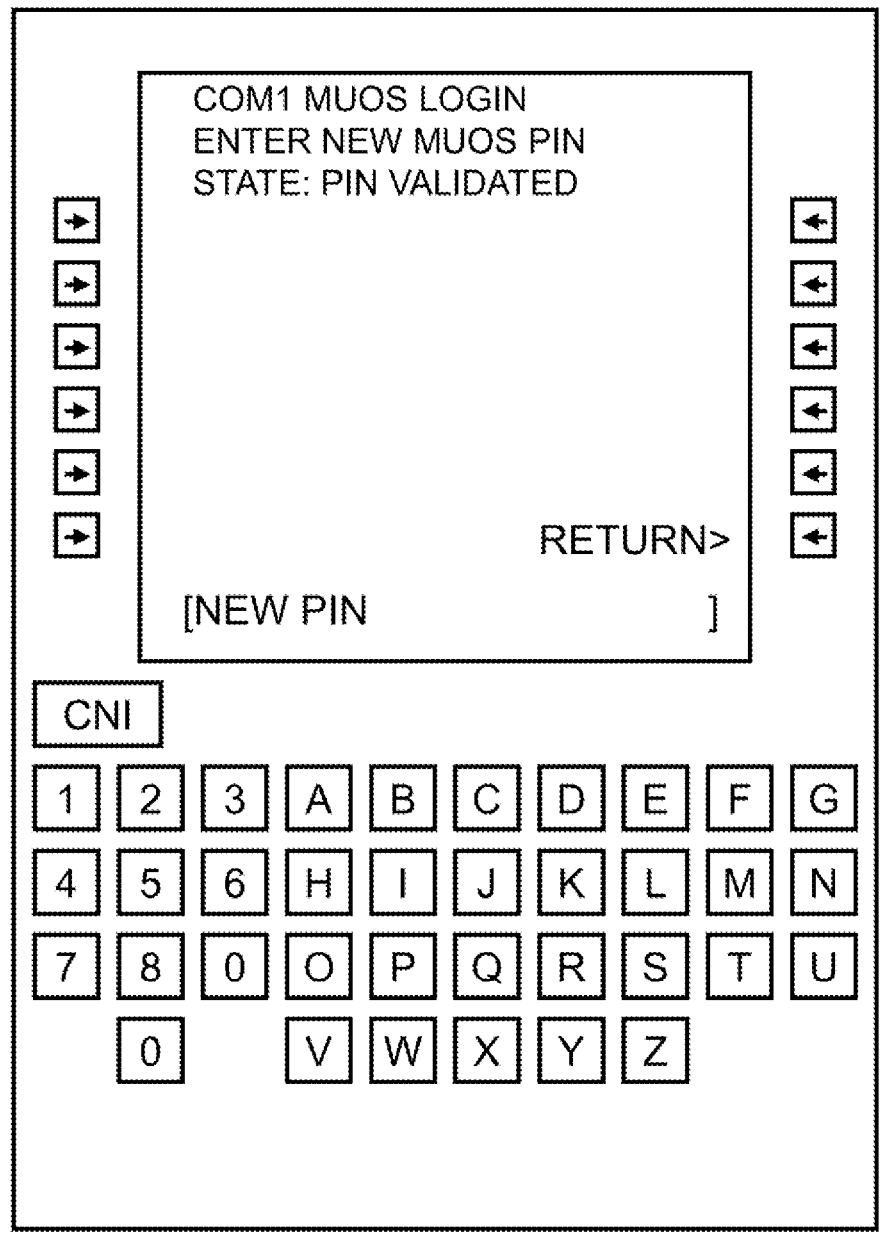
Figure 9D:
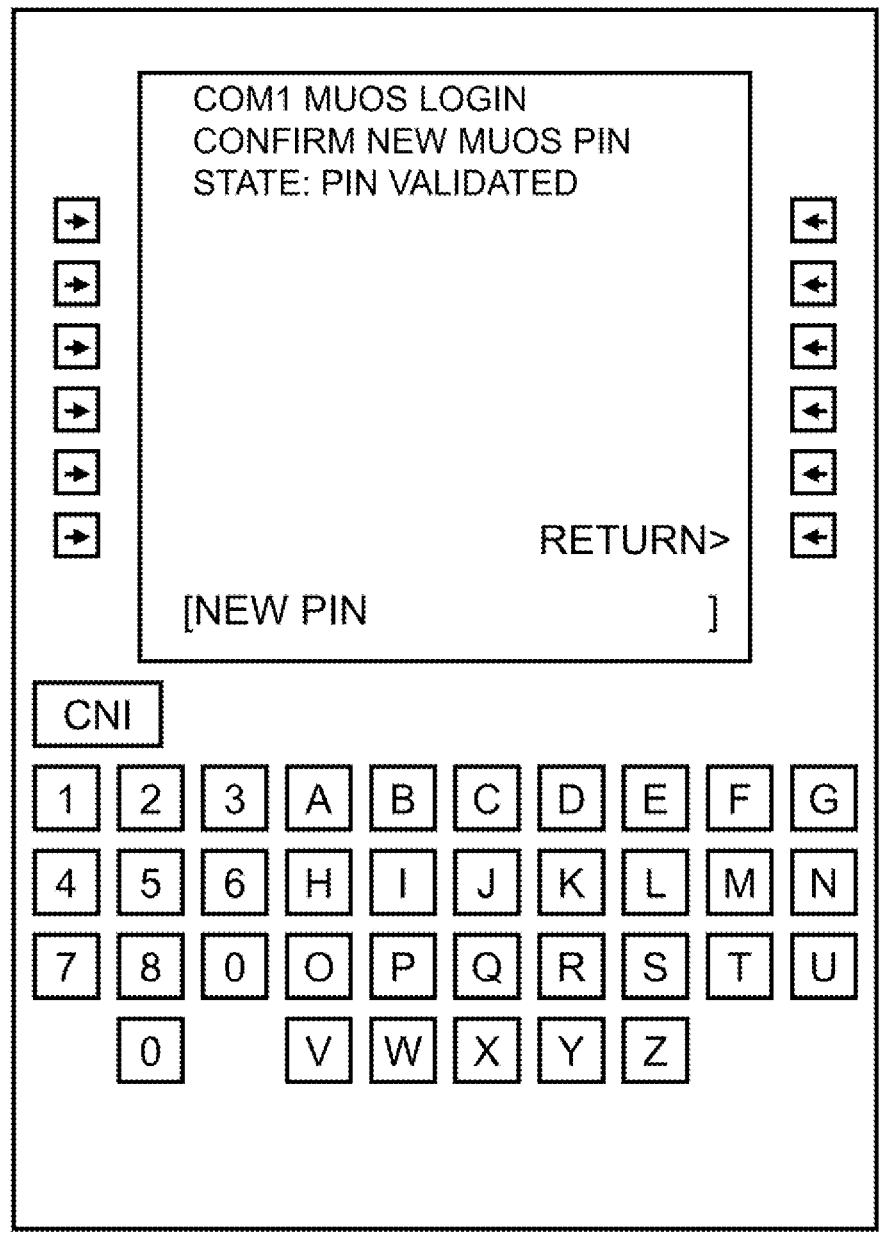

Referring now to FIGS. 8A-8C, a fourth use case for the CDU is described, in accordance with one or more embodiments of the present disclosure. The fourth use case may also be referred to as inputting an invalid PIN without recovery. The system state starts not validated. In the fourth use case, the remaining number of attempts is at one, such as due to previous attempts using an invalid PIN. An invalid PIN is entered by the keyboard. The avionics management system receives the invalid PIN. The avionics management system then detects the invalid PIN is invalid by comparing the invalid PIN with the correct PIN maintained in memory. The system state is maintained as PIN not validated. The PIN stored in memory is also reset to the default PIN and a command is sent to the radio to zeroize the MUOS COMSEC payload. Upon receiving the command from the avionics management system, the radio may zeroize the COMSEC payload. The CDU may also provide a scratchpad message or other annunciation on the display that the PIN has been reset, the MUOS COMSEC payload has been zeroized, and the system state has been set to PIN not validated. For example, the scratchpad message may read "PIN RESET, COMSEC 0-ED". In some instances, the remaining attempts may allow for ten invalid PINs before resetting the PIN and zeroizing the COMSEC payload, although this is not intended to be limiting.

Referring now to FIGS. 9A-9D, a fifth use case for the CDU is described, in accordance with one or more embodiments of the present disclosure. The fifth use case may also be referred to as changing the PIN. In the fifth use case, the system state may be in the PIN validated state, due to the PIN being previously validated. The operator may access a maintenance page with an option to change the PIN. Upon selecting the option to change the PIN by the corresponding line-select key, the CDU may display a MUOS login page including a prompt to enter the PIN. The PIN is entered and validated against the PIN stored in memory. The CDU then generates a prompt to enter a new PIN. The new PIN is entered. The CDU then generates a prompt to confirm the new PIN. The new PIN is entered again and validated against the new PIN. The new PIN is then stored in memory for future validation purposes. During the fifth use case, the system state is maintained in the validated state, allowing the avionics management system to maintain access to the MUOS feature set and to ensure the radio maintains communications with the MUOS network.

Referring generally again to FIGS. 1A-9D.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A control display unit, the control display unit comprising:
    a display;
    a keyboard;
    a memory maintaining program instructions, a personal identification number (PIN), and a system state; wherein the system state is in one of a not validated state or a validated state; and
    a processor configured to execute the program instructions causing the processor detect an attempt to access a mobile user objective system (MUOS) feature set while the system state is in the not validated state, prevent the control display unit from accessing the MUOS feature set while the system state is in the not validated state, prompt for the PIN on the display in response to detecting the attempt to access the MUOS feature set, receive an input from the keyboard, validate the input with the PIN maintained in the memory, change the system state from the not validated state to the validated state, and allow the control display unit to access the MUOS feature set in response to changing to the validated state;
    wherein the program instructions are configured to cause the processor to receive an input of an invalid PIN input from the keyboard, compare the invalid PIN input with the PIN, and prompt for the PIN in response to comparing the invalid PIN input with the PIN;

wherein the memory maintains a number of remaining attempts; wherein the program instructions are configured to cause the processor to update the number of remaining attempts and prompt the number of remaining attempts on the display in response to comparing the invalid PIN input with the PIN;

wherein, in response to the number of remaining attempts reaching zero, the program instructions are configured to cause the processor to send a zeroization command to a radio, change the system state to the not validated state, and change the PIN to a default PIN: wherein the zeroization command sent to the radio causes the radio to zeroize a communication security (COMSEC) payload.

2. The control display unit of claim 1, wherein the MUOS feature set comprises a MUOS presets page; wherein detecting the attempt to access the MUOS feature set comprises receiving an input to display the MUOS presets page on the display; wherein preventing the control display unit from accessing the MUOS feature set comprises preventing the control display unit from displaying the MUOS presets page on the display; wherein allowing the control display unit to access the MUOS feature set comprises causing the control display unit to display the MUOS presets page on the display.

3. The control display unit of claim 1, wherein the MUOS feature set comprises causing the control display unit to tune the radio to a MUOS preset; wherein detecting the attempt to access the MUOS feature set comprises receiving an input to cause the control display unit to tune the radio to the MUOS preset; wherein preventing the control display unit from accessing the MUOS feature set comprises preventing the control display unit from tuning the radio to the MUOS preset; wherein allowing the control display unit to access the MUOS feature set comprises causing the control display unit to tune the radio to the MUOS preset.

4. The control display unit of claim 1, further comprising a hard key; wherein the program instructions are configured to cause the processor display a communication page on the display in response to receiving an input of the hard key.

5. The control display unit of claim 1, wherein the PIN is changed from the default PIN; wherein the default PIN is set by an operational flight program; wherein the program instructions are configured to cause the processor to change the default PIN to the PIN by prompting for the default PIN on the display, receiving a first input by the keyboard, validating the first input with the default PIN, prompting for the PIN on the display, receiving a second input by the keyboard, prompting for a confirmation of the PIN on the display, receiving a third input by the keyboard, validating the third input with the second input, and storing the PIN in memory.

6. The control display unit of claim 5, wherein the program instructions are configured to cause the processor to limit the PIN to a minimum number of characters and a maximum number of characters.

7. The control display unit of claim 6, wherein the keyboard is an alphanumeric keyboard; wherein the PIN is an alphanumeric PIN; wherein the input is an alphanumeric input; wherein the characters are alphanumeric characters.

8. The control display unit of claim 1, wherein the program instructions are configured to cause the processor to change the PIN to a new PIN by prompting for the PIN on the display, receiving a first input by the keyboard, validating the first input with the PIN, prompting for the new PIN on the display, receiving a second input by the keyboard, prompting for a confirmation of the new PIN on the display, receiving a third input by the keyboard, validating the third input with the second input, and storing the new PIN in memory.

9. An avionics management system comprising:
at least one control display unit comprising a display and a keyboard;
a processing unit communicatively coupled to the at least one control display unit; the processing unit comprising:
a memory maintaining program instructions, a personal identification number (PIN), and a system state; wherein the system state is in one of a not validated state or a validated state; and
a processor configured to execute the program instructions causing the processor to detect an attempt to access a mobile user objective system (MUOS) feature set while the system state is in the not validated state, prevent the at least one control display unit from accessing the MUOS feature set while the system state is in the not validated state, prompt for the PIN on the display in response to detecting the attempt to access the MUOS feature set, receive an input from the keyboard, compare the input with the PIN maintained in memory, change the system state from the not validated state to the validated state, and allow the at least one control display unit to access the MUOS feature set in response to changing to the validated state;
wherein the program instructions are configured to cause the processor to receive an input of an invalid PIN input from the keyboard, compare the invalid PIN input with the PIN, and prompt for the PIN in response to comparing the invalid PIN input with the PIN;
wherein the memory maintains a number of remaining attempts; wherein the program instructions are configured to cause the processor to update the number of remaining attempts and prompt the number of remaining attempts on the display in response to comparing the invalid PIN input with the PIN;
wherein, in response to the number of remaining attempts reaching zero, the program instructions are configured to cause the processor to send a zeroization command to a radio, change the system state to the not validated state, and change the PIN to a default PIN; wherein the zeroization command sent to the radio causes the radio to zeroize a communication security (COMSEC) payload.

10. The avionics management system of claim 9, wherein the program instructions are configured to cause the processor to detect when all of the at least one control display units are powered off and change the system state to the not validated state in response to detecting all of the least at one control display units are powered off.

11. The avionics management system of claim 10, wherein the at least one control display units comprise at least two control display units; wherein the program instructions are configured to cause the processor to maintain the system state in the validated state while at least one of the at least two control display units remains powered on and change the system state to the not validated state when all of the at least two control display units are powered off.

12. The avionics management system of claim 9, further comprising at least one multi-function display communicatively coupled to the processing unit; wherein the program instructions are configured to cause the processor to prevent the multi-function display from accessing the MUOS feature set when the system state is in the not validated state and to allow the multi-function display to access the MUOS feature set when the system state is in the validated state.

13. An aircraft comprising:
a radio configured to communicate with a mobile user objective system (MUOS) network; wherein the radio maintains a communication security (COMSEC) payload for communicating with the MUOS network; and
an avionics management system comprising:
at least one control display unit comprising a display and a keyboard; wherein the at least one control display unit is communicatively coupled to the radio; wherein the at least one control display unit is configured to receive MUOS information from the MUOS network by way of the radio; and
a processing unit communicatively coupled to the at least one control display unit; the processing unit comprising:
a memory maintaining program instructions, a personal identification number (PIN), and a system state; wherein the system state is in one of a not validated state or a validated state; and
a processor configured to execute the program instructions causing the processor to detect an attempt to access a MUOS feature set while the system state is in the not validated state, prevent the at least one control display unit from accessing the MUOS feature set while the system state is in the not validated state, prompt for the PIN on the display in response to detecting the attempt to access the MUOS feature set, receive an input from the keyboard, compare the input with the PIN maintained in memory, change the system state from the not validated state to the validated state, and allow the at least one control display unit to access the MUOS feature set in response to changing to the validated state;
wherein the program instructions are configured to cause the processor to receive an input of an invalid PIN input from the keyboard, compare the invalid PIN input with the PIN, and prompt for the PIN in response to comparing the invalid PIN input with the PIN;
wherein the memory maintains a number of remaining attempts; wherein the program instructions are configured to cause the processor to update the number of remaining attempts and prompt the number of remaining attempts on the display in response to comparing the invalid PIN input with the PIN;
wherein, in response to the number of remaining attempts reaching zero, the program instructions are configured to cause the processor to send a zeroization command to the radio, change the system state to the not validated state, and change the PIN to a default PIN; wherein the zeroization command sent to the radio causes the radio to zeroize the COMSEC payload.

14. The aircraft of claim 13, wherein the COMSEC payload comprises a cryptographic key; wherein the radio is configured to zeroize the cryptographic key.

15. The aircraft of claim 13, wherein the MUOS feature set comprises at least one of a MUOS presets page or causing the at least one control display unit to tune the radio to a MUOS preset.

* * * * *